(12) United States Patent
Ono et al.

(10) Patent No.: US 8,125,873 B2
(45) Date of Patent: Feb. 28, 2012

(54) OBJECTIVE LENS FOR OPTICAL PICKUP DEVICE, AND OPTICAL PICKUP DEVICE

(75) Inventors: Yuki Ono, Hachioji (JP); Kohei Ota, Hachioji (JP); Kentarou Nakamura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 149 days.

(21) Appl. No.: 12/680,194

(22) PCT Filed: Sep. 26, 2008

(86) PCT No.: PCT/JP2008/067439
§ 371 (c)(1),
(2), (4) Date: Mar. 25, 2010

(87) PCT Pub. No.: WO2009/047989
PCT Pub. Date: Apr. 16, 2009

(65) Prior Publication Data
US 2010/0260031 A1    Oct. 14, 2010

(30) Foreign Application Priority Data
Oct. 11, 2007 (JP) .................................. 2007-265110

(51) Int. Cl.
*G11B 7/00* (2006.01)
(52) U.S. Cl. .......... 369/112.07; 369/112.08; 369/112.26

(58) Field of Classification Search ........................ None
See application file for complete search history.

(56) References Cited

U.S. PATENT DOCUMENTS

| 2004/0047269 A1* | 3/2004 | Ikenaka et al. ............ 369/112.08 |
| 2005/0068881 A1* | 3/2005 | Kimura et al. ............ 369/112.23 |
| 2005/0083562 A1* | 4/2005 | Hendriks ....................... 359/205 |

FOREIGN PATENT DOCUMENTS

| JP | 10-133104 | 5/1998 |
| JP | 2002-290100 | 10/2002 |
| JP | 2006-164498 | 6/2006 |
| JP | 2007-163780 | 6/2007 |
| WO | WO 2005/088364 | 9/2005 |
| WO | WO 2007/043226 | 4/2007 |
| WO | WO 2007/102318 | 9/2007 |

* cited by examiner

*Primary Examiner* — Paul Huber
(74) *Attorney, Agent, or Firm* — Cozen O'Connor

(57) ABSTRACT

Provided is an objective lens for an optical pickup apparatus. The objective lens collects diffracted light generated by an optical path difference giving structure onto the information recording surface of an optical information recording medium as a spot and suppresses fluctuation of diffraction efficiency due to a change of using wavelength. The optical pickup apparatus using such objective lens is also provided. The total diffraction efficiency can be improved by adjusting a wavelength at which the diffraction efficiencies of a plurality of basic structures forming the optical path difference giving structure in the objective lens are maximum, in accordance with a basic structure.

14 Claims, 6 Drawing Sheets

OBJECTIVE LENS FOR OPTICAL PICKUP DEVICE, AND OPTICAL PICKUP DEVICE

RELATED APPLICATIONS

This is a U.S. National Phase Application under 35 U.S.C. 371 of International Application PCT/JP2008/067439, filed on Sep. 26, 2008.

This application claims the priority of Japanese Application No. 2007-265110 filed on Oct. 11, 2007, the entire content of which is hereby incorporated by reference.

FIELD OF THE INVENTION

The present invention relates to an objective lens for an optical pickup apparatus, and an optical pickup apparatus using the same, wherein the light flux of a short wavelength is converged as a spot on the information recording surface of an optical recording medium, and the information recording and/or reproduction (may be described as "recording/reproduction" in this Specification) is performed thereby.

BACKGROUND

A diffraction objective lens having a diffraction structure formed on the optical surface has been put into commercial use as an objective lens for an optical pickup apparatus. In an objective lens for the optical pickup apparatus interchangeably used with both the DVD and CD, for example, the spherical aberration caused by the difference in the substrate thickness between the DVD and CD is offset by the difference in the diffraction action attributable to the difference in the wavelength used, whereby interchangeable use is ensured.

In recent years, the trend in the optical pickup apparatus is moving toward the use of shorter wavelengths for the laser light source employed as a light source for reproduction of information recorded on an optical information recording medium and for recording of the information on an optical information recording medium. The laser light source having a wavelength of 400 through 420 nm is coming into commercial use, as exemplified by the blue-violet semiconductor laser and the blue SHG laser and others wherein the wavelength of the infrared semiconductor laser is converted using the non-linear optical effect. Use of these blue-violet laser light sources allows the 15- through 20-GB information to be recorded on an optical information recording medium having a diameter of 12 cm, when using the objective lens having the same numerical aperture (NA) as that of the DVD (Digital Versatile Disk). If the NA of the objective lens is increased to 0.85, the 23- through 25-GB information can be recorded on the optical information recording medium with a diameter of 12 cm. In the following description of this Specification, the optical information recording medium using a blue-violet laser light source and the magneto-optical recording disk will be collectively called the "high-density optical information recording medium".

In a high-density optical information recording medium using the objective lens having a NA of 0.85, there is an increase in the comatic aberration attributable to the skew of the optical information recording medium. Thus, in some of the recording media, the protective layer is designed thinner than that of the DVD (0.1 mm thick as compared to 0.6° mm for a DVD) to reduce the comatic aberration attributable to the skew. Incidentally, the mere function of appropriate information recording/reproduction using a high-density optical information recording medium of this type does not provide a sufficient value to the optical information recording medium player/recorder (optical information recording/reproduction apparatus). In view of the fact that the DVD and CD (compact disk) with a great variety of information recorded thereon is available on the market at present, the function of merely recording and reproducing using a high-density optical information recording medium is not sufficient. The effort for achieving the similar appropriate information recording/reproduction using the DVD and CD owned by the user can enhance the commercial value of the optical information recording medium player/recorder. Against this backdrop, the optical pickup apparatus mounted on the optical information recording medium player/recorder for high-density optical information recording medium is required to be capable of recording/reproducing the appropriate information, while maintaining compatibility with all of the high-density optical information recording mediums, DVD and CD. To achieve this, many proposals have been submitted regarding the objective lens for optical pickup apparatus interchangeably used with both the high-density optical information recording medium and DVD/CD. In one of such proposals, for example, the spherical aberration resulting from the difference of substrate thickness between the high-density optical information recording medium and DVD/CD is offset by the difference in the diffraction attributable to the difference in the wavelength to be used, whereby compatibility is ensured. Alternatively, without being restricted to interchangeable use, many other proposals have been made, including the diffraction type optical element for color correction and correction of the spherical aberration resulting from temperature change.

A blaze structure having a serrated cross section, stairway structure, binary structure and others have been known as the optical path difference providing structure in such a diffraction optical element. However, it doesn't necessarily follow that only one of these optical path difference providing structures is used with the optical pickup device. A plurality of types of optical path difference providing structures may be superimposed in the same region of one optical surface of an objective lens, for example, or a plurality of types of optical path difference providing structures may be provided in the different regions on one optical surface of the objective lens. Alternatively, both the collimator and objective lens may be provided with optical path difference providing structures, depending on each situation.

The diffraction efficiency of the diffraction optical element is determined by the optical path difference providing structure and wavelength to be utilized. However, diffraction efficiency tends to vary with reference to the design standard value (hereinafter referred to as "wavelength-dependent fluctuation of diffraction efficiency") by a change in the wavelength to be used and a change in refractive index resulting from the change in the wavelength to be used. Especially when high-order diffraction light is used, the wavelength-dependent fluctuation of diffraction efficiency is greater than when low-order diffraction light is used. For example, in an interchangeable objective lens wherein the blue-violet laser light for high-density optical information recording medium, red laser for DVD and infrared laser for CD are used in common, high-order diffraction light (second- or higher-order) is used for the blue-violet laser light to perform aberration correction in many cases. Thus, in such cases, there is an increase in the wavelength-dependent fluctuation of diffraction efficiency.

However, in the commonly used optical pickup apparatus, the intensity of the light emitted from the semiconductor laser is monitored and feedback control is provided in such a way as to get the spot having strength suitable for information recording/reproduction. However, a change in the diffraction efficiency of the objective lens is not monitored. If there is a great fluctuation in this change, the spot having the strength suitable for information recording/reproduction may not be obtained. By contrast, in the optical pickup apparatus wherein a diffraction optical element is used, the arts disclosed in the following Patent Literatures are available to get the appropriate diffraction efficiency:

Patent Literature 1: Japanese Patent Application Publication No. 2001-93179

Patent Literature 2: Japanese Patent Application Publication No. Hei 10 (1998)-133104

DISCLOSURE OF THE INVENTION

Problems to be Solved by the Invention

Regarding the diffraction optical element for the optical pickup apparatus using the blue-violet laser light and red laser light, the Patent Literature 1 discloses that, for the blue-violet laser light, the diffraction light having the order of diffraction higher than that of the red laser light is used, whereby the diffraction efficiency for both cases is enhanced. However, there is no description on the art of reducing the wavelength-dependent fluctuation of diffraction efficiency. Patent Literature 2 discloses the method of designing the cross section of the phase structure with consideration given to the diffraction efficiency, and illustrates the lens and others having an almost uniform diffraction efficiency over the entire range of optical surfaces. However, there is no description on the art of reducing the wavelength-dependent fluctuation of diffraction efficiency.

In view of the problems described above, it is an object of the present invention to provide an objective lens for optical pickup apparatus and an optical pickup apparatus using the same, wherein the diffraction light produced by an optical path difference providing structure is converged as a spot onto the information recording surface of an optical information recording medium, and the wavelength-dependent fluctuation of diffraction efficiency can be suppressed. In particular, the object of the present invention is to provide an objective lens for optical pickup apparatus and an optical pickup apparatus using the same, wherein the objective lens is a diffraction type compatible objective lens using the blue-violet laser light, red laser light and infrared laser light, and the wavelength-dependent fluctuation of diffraction efficiency is minimized.

Means for Solving the Problems

To solve the aforementioned problems, the invention described in Claim 1 is an objective lens for an optical pickup apparatus; wherein the light flux having a predetermined wavelength $\lambda 1$ meeting 390 nm$\leq \lambda 1 \leq$420 nm is converged on the information recording surface of an optical information recording medium, and information is thereby recorded and/or reproduced; and wherein at least part of a plurality of basic structures as the optical path difference providing structures are superimposed and formed on a predetermined region of the optical surface, with the following expression being satisfied:

$$(\lambda\beta-\lambda 1)\times(\lambda\alpha-\lambda 1)<0 \quad (1)$$

wherein $\lambda\alpha$ denotes the wavelength wherein the diffraction efficiency of a certain basic structure is maximized within the wavelength $\lambda 1\pm 50$ nm, and $\lambda\beta$ indicates the wavelength wherein the diffraction efficiency of another basic structure is maximized within the wavelength $\lambda 1\pm 50$ nm.

When using a plurality of basic structures formed on an objective lens, since the functions of basic structures are different, the wavelength (peak) wherein the diffraction efficiency is maximized is some distance away from the wavelength to be used, depending on the basic structure. As a result, when the light flux of wavelength $\lambda 1$ has passed through a plurality of basic structures, the total diffraction efficiency may be reduced with reference to the fluctuation in wavelength. Then in the optical pickup apparatus, there will be no correspondence between the intensity of the light flux emitted from the light source monitored just before the objective lens, and the intensity of the spot formed by conversion of light on the information recording surface of the optical information recording medium. This may cause difficulties in the appropriate information recording and reproduction. By contrast, the present invention suppresses the total wavelength-dependent fluctuation of diffraction efficiency when the light flux $\lambda 1$ passes through a plurality of basic structures.

If the wavelength $\lambda\alpha$ wherein the diffraction efficiency of a certain basic structure is maximized, and the wavelength $\lambda\beta$ wherein the diffraction efficiency of another basic structure is maximized are both smaller than wavelength $\lambda 1$ ($\lambda 1 > \lambda\alpha, \lambda\beta$), or are both greater than wavelength $\lambda 1$ ($\lambda 1 < \lambda\alpha, \lambda\beta$), then the total diffraction efficiency exhibits a considerable fluctuation with reference to the fluctuation in wavelength when the light flux of the wavelength $\lambda 1$ has passed through a plurality of basic structures. Thus, if the expression (1) is satisfied, it is possible to ensure a more effective reduction of the total wavelength-dependent fluctuation of diffraction efficiency when wavelength $\lambda 1$ passes through a plurality of basic structures.

If a plurality of basic structures as the optical path difference providing structures are not to be superimposed and formed on a predetermined region of the optical surface, the basic structure formed in a certain region will be characterized by higher diffraction efficiency when a wavelength fluctuation has occurred, whereas the basic structure formed in another region will be characterized by lower diffraction efficiency. This may result in deterioration of the beam profile. By contrast, if at least part of a plurality of basic structures as the optical path difference providing structures are superimposed and formed, as in the present invention, the beam profile can be maintained in good conditions, while reduction of the wavelength-dependent fluctuation of diffraction efficiency is suppressed.

The objective lens for the optical pickup apparatus described in Claim 2 is the same as the invention of Claim 1, further characterized in that the following expression is met:

$$4\text{ nm}\leq|\lambda\alpha-\lambda\beta|\leq 60\text{ nm} \quad (2)$$

Even if the wavelength-dependent fluctuation of diffraction efficiency can be suppressed by meeting the expressions (1) and (2), a great reduction in the diffraction efficiency itself at wavelength $\lambda 1$ can be avoided, and sufficient diffraction efficiency at wavelength $\lambda 1$ can be maintained.

The objective lens for the optical pickup apparatus described in Claim 3 is the same as the invention of Claim 1 or 2, further characterized in that the above-mentioned objective lens converges the light flux of the wavelength $\lambda 1$ onto the information recording surface of the optical information recording medium having a protective substrate thickness of t1, whereby information is recorded and/or reproduced; and, at the same time, converges the light flux of the wavelength $\lambda 2$ ($\lambda 2 > \lambda 1$) onto the information recording surface of the optical information recording medium having a protective substrate thickness of t2 (t2$\geq$t1), whereby information is recorded and/or reproduced.

The objective lens for the optical pickup apparatus described in Claim 4 is the same as the invention of Claim 1 or 2, further characterized in that the above-mentioned objective lens converges the light flux of the wavelength λ1 onto the information recording surface of the optical information recording medium having a protective substrate thickness of t1, whereby information is recorded and/or reproduced; converges the light flux of the wavelength λ2 (λ2>λ1) onto the information recording surface of the optical information recording medium having a protective substrate thickness of t2 (t2≧t1), whereby information is recorded and/or reproduced; and converges the light flux of the wavelength λ3 (λ3>λ2) onto the information recording surface of the optical information recording medium having a protective substrate thickness of t3 (t3>t2), whereby information is recorded and/or reproduced.

The objective lens for the optical pickup apparatus described in Claim 5 is the same as the invention of Claim 4, further characterized in that a plurality of the above-mentioned basic structures includes the first, second and third basic structures, wherein:

the first basic structure is an optical path difference providing structure for ensuring that the amount of diffracted light on the r-order (wherein "r" is an integer) of the light flux having the wavelength λ1 having passed through the first basic structure is greater than that of the diffracted light on any other order, the amount of diffracted light on the s-order (wherein "s" is an integer) of the light flux having the wavelength λ2 is greater than that of the diffracted light on any other order, and the amount of diffracted light on the t-order (wherein "t" is an integer) of the light flux having the wavelength λ3 is greater than that of the diffracted light on any other order; and the second basic structure is an optical path difference providing structure for ensuring that the amount of diffracted light on the u-order (wherein "u" is an integer) of the light flux having the wavelength λ1 having passed through the second basic structure is greater than that of the diffracted light on any other order, the amount of diffracted light on the v order (wherein "v" is an integer) of the light flux having the wavelength λ2 is greater than that of the diffracted light on any other order, and the amount of diffracted light on the w-order (wherein "w" is an integer) of the light flux having the wavelength λ3 is greater than that of the diffracted light on any other order.

The objective lens for the optical pickup apparatus described in Claim 6 is the same as the invention of Claim 5, further characterized in that a plurality of the above-mentioned basic structures include a third basic structure in addition to the first and second basic structures, and the third basic structure is an optical path difference providing structure for ensuring that the amount of diffracted light on the x-order (wherein "x" is an integer) of the light flux having the wavelength λ1 having passed through the third basic structure is greater than that of the diffracted light on any other order, the amount of diffracted light on the y-order (wherein "y" is an integer) of the light flux having the wavelength λ2 is greater than that of the diffracted light on any other order, and the amount of diffracted light on the z-order (wherein "z" is an integer) of the light flux having the wavelength λ3 is greater than that of the diffracted light on any other order.

The objective lens for the optical pickup apparatus described in Claim 7 is the same as the invention of Claim 6, further characterized in that r=0, s=0, t=±1, u=2, v=1, w=1, x=10, y=6, z=5.

The objective lens for the optical pickup apparatus described in Claim 8 is the same as the invention of any one of the Claims 4 through 7, further characterized in that at least one of the above-mentioned basic structures is capable of correcting the spherical aberration caused by the thickness of the protective substrate of the optical information recording medium, in response to the difference between the wavelengths λ1 and λ2.

The objective lens for the optical pickup apparatus described in Claim 9 is the same as the invention of any one of the Claims 4 through 8, further characterized in that at least one of the above-mentioned basic structures is capable of correcting the spherical aberration caused by the thickness of the protective substrate of the optical information recording medium, in response to the difference between the wavelengths λ1 and λ3.

The objective lens for the optical pickup apparatus described in Claim 10 is the same as the invention of any one of the Claims 4 through 7, further characterized in that at least one of the above-mentioned basic structures is capable of correcting the spherical aberration caused by the thickness of the protective substrate of the optical information recording medium, in response to the difference between the wavelengths λ1 and wavelengths other than λ1, and another of the above-mentioned basic structures is capable of correcting the spherical aberration caused by the temperature change when performing recording and/or reproducing operation into/from the optical information recording medium, using the light flux having the wavelength λ1.

The objective lens for the optical pickup apparatus described in Claim 11 is the same as the invention of any one of the Claims 1 through 9, further characterized in that at least one of the above-mentioned basic structures is capable of correcting the spherical aberration caused by the temperature change when performing recording and/or reproducing operation into/from the optical information recording medium, using the light flux having the wavelength λ1.

The objective lens for the optical pickup apparatus described in Claim 12 is the same as the invention of any one of the Claims 1 through 11, further characterized in that both the basic structure wherein the diffraction efficiency of wavelength λα is maximized, and the basic structure wherein the diffraction efficiency of wavelength λβ is maximized have the level difference that provides the optical path difference corresponding to four or more wavelengths λ1.

If the basic structure has the level difference that provides the optical path difference corresponding to four or more wavelengths λ1, the wavelength-dependent fluctuation of diffraction efficiency is increased in particular. Thus, the advantages of the present invention can be made more prominent by the above-mentioned arrangement.

The optical pickup apparatus described in Claim 13 includes a light source for emitting the light flux having a wavelength λ1, and an objective lens described in any one of the aforementioned Claims 1 through 12.

The optical pickup apparatus described in Claim 14 is the same as the invention of Claim 13, further characterized by including a monitoring device for monitoring the intensity of the light flux before the light flux coming out of the light source enters the objective lens.

The optical pickup apparatus of the present invention includes a light source for emitting the light flux having a wavelength λ1 (hereinafter referred to as "first light source"). In addition to this first light source, this optical pickup apparatus can also include a light source for emitting the light flux having a wavelength λ2 (hereinafter referred to as "second light source"), and furthermore, a light source for emitting the light flux having a wavelength λ3 (hereinafter referred to as "third light source"). Further, the optical pickup apparatus of the present invention includes a light converging optical system for converging the light flux coming from the first light source (hereinafter referred to as "first light flux") onto the information recording surface of the first optical information recording medium. When the second light source is provided, this light converging optical system converges the light flux coming from the second light source (hereinafter referred to as "second light flux") onto the information recording surface of the second optical information recording medium. When the third light source is provided, this light converging optical system converges the light flux coming from the third light source (hereinafter referred to as "third light flux") onto the information recording surface of the third optical information recording medium. Further, the optical pickup apparatus of the present invention includes a light receiving element for receiving the light reflected from the information recording surface of the first optical information recording medium. The optical pickup apparatus of the present invention can include a light receiving element for receiving the light reflected from the information recording surface of the second or third optical information recording mediums.

The first optical information recording medium includes a protective substrate having a thickness of t1, and an information recording surface. The second optical information recording medium includes a protective substrate having a thickness of t2 (t1≦t2), and an information recording surface. The third optical information recording medium includes a protective substrate having a thickness of t3 (t2<t3), and an information recording surface. It is preferred that the first optical information recording medium be a high-density optical information recording medium, the second optical information recording medium be a DVD, and the third optical information recording medium be a CD, without the present invention being restricted thereto. The first, second or third optical information recording mediums can be a multi-layer optical information recording medium containing a plurality of information recording surfaces.

In the present Specification, the high-density optical information recording medium is exemplified by the optical information recording medium (e.g. BD, Blue-ray Disk) wherein the objective lens with a NA of 0.85 is used for information and recording and reproduction, and the protective substrate has a thickness of about 0.1 mm. The high-density optical information recording medium is further exemplified by the optical information recording medium (e.g. HD DVD, also referred to simply as "HD") wherein the objective lens with a NA of 0.65 through 0.67 is used for information and recording and reproduction, and the protective substrate has a thickness of about 0.6 mm. Further, the high-density optical information recording medium also includes the protective film (the protective film is included in the protect substrate in the present Specification) having a thickness of several nanometers through several tens of nanometers on the information recording surface. The high-density optical information recording medium without a protective substrate formed thereon is also included. The high-density optical information recording medium also includes the magneto-optical disk wherein a blue-violet semiconductor laser and blue-violet SHG laser are used as an information recording/reproduction light source. In the present Specification, the DVD is a generic term denoting the DVD series optical information recording media wherein information recording and/or reproduction is performed by the objective lens with a NA of 0.60 through 0.67, and the protective substrate has a thickness of 0.6 mm. Thus, the DVD includes the DVD-ROM, DVD-Video, DVD-Audio, DVD-RAM, DVD-R, DVD-RW, DVD+R, and DVD+RW. In this Specification, the CD is a generic term denoting the CD series optical information recording media wherein information recording and/or reproduction is performed by the objective lens with a NA of 0.45 through 0.51, and the protective substrate has a thickness of about 1.2 mm. Thus, the CD includes the CD-ROM, CD-Audio, CD-Video, CD-R and CD-RW. The recording density of the high-density optical information recording medium is the highest. This is followed the recording density of the DVD and CD in the reducing order.

The thicknesses of the protective substrate t1, t2 and t3 preferably meet the following conditions (7), (8) and (9), without the present invention being restricted thereto:

$$0.075 \text{ mm} \leq t1 \leq 0.125 \text{ mm or } 0.5 \text{ mm} \leq t1 \leq 0.7 \text{ mm} \tag{7}$$

$$0.5 \text{ mm} \leq t2 \leq 0.7 \text{ mm} \tag{8}$$

$$1.0 \text{ mm} \leq t3 \leq 1.3 \text{ mm} \tag{9}$$

In the present Specification, the first, second and third light sources are preferably the laser light source. The semiconductor laser, silicon laser and others are preferably used as the laser light source. The wavelength $\lambda 1$ of the first light flux emitted from the first light source, the wavelength $\lambda 2$ ($\lambda 2 > \lambda 1$) of the second light flux emitted from the second light source and the wavelength $\lambda 3$ ($\lambda 3 > \lambda 2$) of the third light flux emitted from the third light source preferably meet the following expressions (10) and (11):

$$1.5 \times \lambda 1 < \lambda 2 < 1.7 \times \lambda 1 \tag{10}$$

$$1.9 \times \lambda 1 < \lambda 3 < 2.1 \times \lambda 1 \tag{11}$$

When the BD or HD, DVD and CD are used as the first, second and third recording media, respectively, the wavelength $\lambda 1$ of the first light flux emitted from the first light source is 390 nm or more without exceeding 420 nm. Further, the wavelength $\lambda 2$ of the second light flux emitted from the second light source is preferably 570 nm or more without exceeding 680 nm, more preferably x0 nm or more without exceeding 670 nm. The wavelength $\lambda 3$ of the third light flux emitted from the third light source is preferably 750 nm or more without exceeding 880 nm, more preferably 760 nm or more without exceeding 820 nm.

At least two of the first, second and third light sources can be unitized. Unitization refers to the first and second light sources fixed and stored in one package, for example.

The optical detector such as a diode is preferably used as a light receiving element. The light reflected on the information recording surface of the optical information recording medium enters the light receiving element. The input signal thereof is used to get the readout signal of the information recorded on each optical information recording medium. Further, it is also possible to adopt such a structure as to detect the change in the amount of light resulting from the change in the configuration and position of the spot on the light receiving element, whereby focusing detection and track detection are performed. Based on this detection, the objective lens for focusing and tracking can be moved. The light receiving element can be made up of a plurality of optical detectors. The light receiving element can be provided with a main optical detector and a subsidiary detector. For example, two subsidiary optical detectors are provided on both sides of the optical detector receiving the main light used for information recording and reproduction, thereby constituting a light receiving element wherein the subsidiary light for tracking adjustment is received by these two subsidiary optical detectors. Further, the light receiving element may be equipped with a plurality of light receiving elements corresponding to respective light sources.

The optical pickup apparatus is preferably provided with a monitor device for monitoring the intensity of the light flux, before the light flux emitted from the light source enters the objective lens. Such a monitoring device can detect the intensity of the light flux coming from the light source, but does not detect the intensity of the light flux after having passed through the objective lens. Accordingly, this device cannot detect the fluctuation in diffraction efficiency in such an optical path difference providing structure as the basic structure. Thus, the advantages of the present invention are effectively utilized in an optical pickup apparatus equipped with such a monitoring device.

The light converging optical system has an objective lens. Although this system can be provided with an objective lens alone, the system can be also equipped with a coupling lens such as a collimator lens, in addition to the objective lens. The coupling lens refers to the single lens or lens group arranged between the objective lens and light source to change the angle of divergence of the light flux. The collimator lens is a type of coupling lens to convert the light having entered the collimator lens into parallel light, which is then outputted. Further, the light converging optical system can be provided with an optical element such as a diffraction optical element for ensuring that the light flux coming from the light source is divided into the main light flux used for recording and reproduction of information, and the subsidiary light flux used for tracking and other purposes. In this Specification, the objective lens refers to the optical system which is arranged opposite to the optical information recording medium in the optical pickup apparatus, and has a function of ensuring that the light flux emitted from the light source is converged onto the information recording surface of the optical information recording medium. Preferably, the objective lens refers to the optical system which is arranged opposite to the optical information recording medium in the optical pickup apparatus, and has a function of ensuring that the light flux emitted from the light source is converged onto the information recording surface of the optical information recording medium, further characterized in that this objective lens can be displaced integrally at least in the direction of optical axis by an actuator. The objective lens can be made up of more than two lenses or a single lens alone. The objective lens can be a glass lens, a plastic lens, or a hybrid lens wherein an optical path difference providing structure is formed on the glass lens by photocurable resin and others. When the objective lens is a plastic lens, and is provided with the optical path difference providing structure for correcting the spherical aberration resulting from temperature change, the present invention is capable of reducing the wavelength fluctuation in diffraction efficiency. Thus, the advantages of the present invention are more effectively utilized when the objective lens is made of a plastic lens. When a plurality of objective lenses is to be used, a combination of the glass lenses and plastic lenses can be employed. When a plurality of objective lenses are to be used, it is possible to utilized a combination of the flat plate optical element having an optical path difference providing structure as a basic structure, and aspherical lenses (wherein an optical path difference providing structure may or may not be provided). The objective lens is preferred to have an aspherical refractive surface. The objective lens is preferably designed in such a way that the base surface provided with the optical path difference providing structure as a basic structure is aspherical.

When a glass lens is used as the objective lens, it is preferred to use the glass material having a glass transition temperature Tg of 400 degrees Celsius or less. Use of the glass material having a glass transition temperature Tg of 400 degrees Celsius or less allows molding to be performed at a lower temperature, whereby the service life of the die can be prolonged. The glass material having a low glass-transition temperature Tg is exemplified by the K-PG325 and K-PG375 (product name) by Sumida Optical Glass Co., Ltd.

Incidentally, if a glass lens is used as the objective lens, the weight will be generally excessive and a heavy load will be applied to the actuator driving the objective lens, because the weight is greater than that of the resin lens. To avoid this, when the glass lens is used as the objective lens, it is preferred to use the glass lens having a relatively small specific gravity. To put it more specifically, the specific gravity is preferably 3.0 or less, more preferably 2.8 or less.

When a plastic lens is used as the objective lens, it is preferred to use the annular olefin-based resin material. In the annular olefin-based resin materials, it is preferred to use the resin material wherein the refractive index for the wavelength of 405 nm at a temperature of 25 degrees Celsius is 1.53 through 1.60, and the percentage of the change in refractive index dN/dT ($°$ C.$^{-1}$) for the wavelength of 405 nm resulting from the temperature change within the range of −5 degrees Celsius through 70 degrees Celsius is $-20\times10^{-5}$ through $-5\times10^{-5}$ (more preferably $-10\times10^{-5}$ through $-8\times10^{-5}$). When a plastic lens is used as the objective lens, it is preferred that the plastic lens is also used as the coupling lens.

The following describes the objective lens. The objective lens contains a plurality of types of basic structures as the optical path difference providing structures formed on the optical surface. The objective lens is defined as an optical path difference providing structure formed to provide a predetermined function to the optical surface. The objective lens is the optical path difference providing structure for ensuring that the amount of diffracted light on the a-order (wherein "a" is an integer) of the light flux having passed through the basic structure is greater than that of the diffracted light on any other order. If, in a certain basic structure and another basic structure, the a-values are equal, and the wavelengths wherein the diffraction efficiency is maximized within the range of wavelength $\lambda1\pm50$ nm are the same, their structures are the basic structures of the same type. In the meantime, if there is a difference in a-values, or in the wavelengths wherein the diffraction efficiency is maximized within the range of wavelength $\lambda1\pm50$ nm, their structures are the basic structures of the different type. "Containing a plurality of types of basic structures" signifies containing at least two types of the basic structures characterized by the different types mentioned above.

When the objective lens is used in the optical pickup apparatus having three light sources—first, second and third light sources, the basic structure is an optical path difference providing structure formed to provide a predetermined function to the optical surface. It is the optical path difference providing structure for ensuring that:

the amount of diffracted light on the a-order (wherein "a" is an integer) of the first light flux having passed through the basic structure is greater than that of the diffracted light on any other order;

the amount of diffracted light on the b-order (wherein "b" is an integer) of the second light flux is greater than that of the diffracted light on any other order; and the amount of diffracted light on the c-order (wherein "c" is an integer) of the third light flux having passed through the basic structure is greater than that of the diffracted light on any other order. In this case, if, in a certain basic structure and another basic structure, the values a, b and c are equal, and the wavelengths wherein the diffraction efficiency is maximized within the range of wavelength $\lambda1\pm50$ nm are the same, their structures are the basic structures of the same type. In the meantime, if there is a difference in any one of values a, b and c, or in the wavelengths wherein the diffraction efficiency is maximized within the range of wavelength λ1±50 nm, their structures are the basic structures of the different type. "Containing a plurality of types of basic structures" signifies containing at least two types of the basic structures characterized by the different types mentioned above.

When the objective lens used in the optical pickup apparatus having three light sources is provided with a plurality of basic structures, and a plurality of these basic structures include the first and second basic structures:

the first basic structure is the optical path difference providing structure for ensuring that:

the amount of diffracted light on the r-order (wherein "r" is an integer) of the first light flux having passed through the first basic structure is greater than that of the diffracted light on any other order;

the amount of diffracted light on the s-order (wherein "s" is an integer) of the second light flux is greater than that of the diffracted light on any other order; and the amount of diffracted light on the t-order (wherein "t" is an integer) of the third light flux is greater than that of the diffracted light on any other order; and the second basic structure is the optical path difference providing structure for ensuring that:

the amount of diffracted light on the u-order (wherein "u" is an integer) of the first light flux having passed through the second basic structure is greater than that of the diffracted light on any other order; the amount of diffracted light on the v-order (wherein "v" is an integer) of the second light flux is greater than that of the diffracted light on any other order; and the amount of diffracted light on the w-order (wherein "w" is an integer) of the third light flux is greater than that of the diffracted light on any other order.

In this case, if (1) any one of values r, s, t and u, v, w, are different, or (2) r, s and t are equal to u, v and w, the wavelengths wherein the diffraction efficiency is maximized within the range of wavelength λ1±50 nm are different between the first and second basic structures. Further, a plurality of basic structures can include a third basic structure in addition to the first and second surface tensions. The third basic structure is the optical path difference providing structure for ensuring that:

the amount of diffracted light on the x-order (wherein "x" is an integer) of the first light flux having passed through the third basic structure is greater than that of the diffracted light on any other order;

the amount of diffracted light on the y-order (wherein "y" is an integer) of the second light flux is greater than that of the diffracted light on any other order; and the amount of diffracted light on the z-order (wherein "z" is an integer) of the third light flux is greater than that of the diffracted light on any other order. In this case, if (1) any one of values r, s, t and x, y, z are different, or (2) r, s and t are equal to x, y and z, the wavelengths wherein the diffraction efficiency is maximized within the range of wavelength λ1±50 nm are different between the first and third basic structures.

The optical path difference providing structure mentioned in the present Specification is a generic term denoting the structure for providing an optical difference to the incoming light flux. The optical path difference providing structure includes the phase providing structure. The phase providing structure includes the diffraction structure. The optical path difference providing structure contains a level difference, preferably a plurality of level differences. These level differences provide an optical path difference and/or phase difference to the incoming light flux. The optical difference provided by the optical path difference providing structure can have an integral multiple of the wavelengths of the incoming light flux or non-integral multiple of the wavelengths. The level difference can be arranged at a cyclic interval in the direction perpendicular to the optical axis, or at a non-cyclic interval in the direction perpendicular to the optical axis.

The predetermined functions of the basic structure can be exemplified by the function for correcting the spherical aberration resulting from the thickness of the protective substrate of the optical information recording medium in response to the difference between the wavelength λ1 and wavelengths other than the wavelength λ1. To put it more specifically, this function includes the function for correcting the spherical aberration resulting from the thickness of the protective substrate of the optical information recording medium in response to the difference between the wavelength λ1 and wavelength λ2, and the function for correcting the spherical aberration resulting from the thickness of the protective substrate of the optical information recording medium in response to the difference between the wavelength λ1 and wavelength λ3. Another example is the function of correcting a change in the spherical aberration caused by the temperature change at the time of recording/reproducing into/from the optical information recording medium using the wavelength λ1.

These basic structures meet the following expression (1), more preferably expression (2).

$$(\lambda\beta-\lambda1)\times(\lambda\alpha-\lambda1)<0 \tag{1}$$

$$4 \text{ nm} \leq |\lambda\alpha-\lambda\beta| \leq 60 \text{ nm} \tag{2}$$

wherein;

λα is the wavelength wherein the diffraction efficiency of a certain basic structure is maximized within the range of wavelength λ1±50 nm, and λβ are the wavelengths wherein the diffraction efficiency of another basic structure is maximized within the range of wavelength λ1±50 nm. Both the basic structure wherein the diffraction efficiency of wavelength λα is maximized, and the basic structure wherein the diffraction efficiency of wavelength λβ is maximized preferably contain the level difference for providing the optical path difference corresponding to four wavelengths λ1. If the level difference for providing the optical path difference corresponding to four wavelengths λ1 is included, the wavelength-dependent fluctuation of diffraction efficiency is increased in particular. Thus, the advantages of the present invention can be made more prominent by adoption of such a structure. Accordingly, the basic structure wherein the diffraction efficiency at wavelength λα is maximized, and the basic structure wherein the diffraction efficiency at wavelength λβ is maximized, are preferably the basic structures B, E, F and others to be described later.

In the basic structure wherein the diffraction efficiency of wavelength λα is maximized or the basic structure wherein the diffraction efficiency of wavelength λβ is maximized, one of the preferred structures is the basic structure wherein at least one of a, b and c is a positive integer, and at least one of a, b and c is a negative integer, when:

the amount of diffracted light on the a-order (wherein "a" is an integer) of the first light flux having passed through the basic structure is greater than that of the diffracted light on any other order;

the amount of diffracted light on the b-order (wherein "b" is an integer) of the second light flux is greater than that of the diffracted light on any other order; and the amount of diffracted light on the c-order (wherein "c" is an integer) of the third light flux having passed through the basic structure is greater than that of the diffracted light on any other order.

The wavelength when the wavelength of the light flux applied to the basic structure is changed and the spot intensity is maximized, and the wavelength when the light amount of the spot is maximized can be regarded as the wavelength wherein the diffraction efficiency of a certain basic structure is maximized.

The diffraction efficiency depends on the depth of the strap of the basic structure. Thus, the diffraction efficiency for each wavelength of the basic structure can be set as appropriate, in response to the application of the optical pickup apparatus. For example, in an optical pickup apparatus for recording and reproducing into/from the BD, and reproducing from the DVD and CD, priority is preferably given to the first light flux in the diffraction efficiency of the basic structure. In the meantime, in an optical pickup apparatus for reproducing from the BD, and recording and reproducing into/from the DVD and CD, priority is preferably given to the second and third light fluxes for the diffraction efficiency of the basic structure at the central region to be described later, and priority is preferably given to the second light flux for the diffraction efficiency of the basic structure at the peripheral region to be described later.

In a plurality of types of basic structures, at least a part thereof is formed superimposed on a predetermined region of the optical surface of the objective lens. Further, all of a plurality of types of basic structures can be superimposed on a predetermined region of the optical surface of the objective lens. In this case, to "superimpose" literally means to put one on top of another. In this Specification, "superimposition" is not recognized:

when one structure and another structure are placed on different optical surfaces, or even when one structure and another structure are placed on one and the same optical surfaces, they each are placed on a different optical surface without the presence of any overlapping region at all.

The basic structure as the optical path difference providing structure preferably has a plurality of concentric straps about the optical axis. The basic structure can be designed to have various forms of cross section (cross section on the surface including the optical axis). The most general cross section of the basic structure is found in cases wherein the cross section including the optical axis of the basic structure is designed in a blaze configuration, as shown in FIGS. 3a and b. In the blaze configuration, the cross section including the optical axis of the optical element having a basic structure is serrated, as shown in FIGS. 3a and b. To put it another way, the basic structure has an oblique surface, neither perpendicular nor parallel to the base surface. Examples include the configuration of repeated stair-step structures as shown in FIG. 3c, and the binary structure as shown in FIG. 3d. In the stair-step structure, the cross section including the optical axis of the optical element having a basic structure has a stair-step appearance. To put it another way, the basic structure has only the surface parallel to the base surface and the surface parallel to the optical axis without having a surface oblique to the base surface, and the length in the direction of optical axis exhibits a stepwise change as one goes toward the base surface. When $a=0$, $b=1$ and $c=0$, the first basic structure exhibits a stair-step appearance as shown in FIG. 3c.

The basic structure is preferably formed by cyclic repetition of a certain unit configuration. The "cyclic repetition of a unit configuration" naturally includes the same configuration repeated at the same cycle. This concept also includes the configuration wherein the unit configuration as a unit of cycle has regularity, and the cycle is gradually prolonged or shortened.

When the basic structure has a blaze configuration, the configuration on the serration as the unit configuration is repeated. As shown in FIG. 3a, the same serrated configuration can be repeated, or as shown in FIG. 3b the size of the serration can be increased or decreased in size as one goes toward the base surface. Alternatively, the configuration can be formed of a combination between the gradual increase in the size of the serration and the gradual decrease in the size of the serration. However, in the case of the gradual change in the size of the serration as well, it is preferred that there be almost no change of the serrated configuration in the size in the direction of the optical axis (or in the direction of the passing beam of light). In the blaze configuration, the length of one serration in the direction of optical axis (length in the direction of the light passing through the serration) is called the pitch depth, and the length along the base surface of one serration is called the pitch width. It is also possible to make such arrangements that the level difference of blaze configuration is oriented opposite to the optical axis (center) in a certain region; the level difference of blaze configuration is oriented to the optical axis (center) in another region; and the transition region required to switch the orientation of the level difference of blaze configuration is provided between the two. This transition region is the region equivalent to the point as the extreme value of the optical path difference, when the optical path difference added by the basic structure as the optical path difference providing structure is represented by the function of the optical path difference. It should be noted that, when the optical path difference has a point corresponding to the extreme value, the inclination of the optical path difference function will be reduced. This allows the strap pitch to be expanded to suppress the reduction in transmittance resulting from the configuration error of the optical path difference providing structure.

When the basic structure has a stair-step configuration, the stair-step configuration as a unit configuration is repeated. The same stair-step structures of several steps (four or five steps) shown in FIG. 3c can be repeated. Further, as one goes toward the base surface, the size of the stair-step is gradually increased or decreased. This configuration can be used, but it is preferred that there be no change in the length in the direction of optical axis (or direction of the light passing through).

When the basic structure has a binary configuration, as one goes toward the base surface, the binary size is gradually increased or decreased. This configuration can be used, but it is preferred that there be no change in the length in the direction of the light passing through. For example, when $a=0$, $b=0$ and $c=\pm 1$, the basic structure assumes the binary configuration shown in FIG. 3d.

In the structure wherein several types of basic structures are superimposed, some trace of the blaze configuration of the basic structure preferably remains. To put it another way, the optical path difference providing structure formed by superimposition of the basic structure preferably has an oblique surface that is neither perpendicular nor parallel to the base surface of the optical element equipped with the optical path difference providing structure. This configuration avoids reduction or loss of the optical functions (e.g., improvement of temperature and wavelength characteristics, diffraction of a particular wavelength alone) intended to be provided in the basic structure. The intended optical functions can be utilized in the optical path difference providing structure formed by superimposition.

In a plurality of types of basic structures, when at least two structures—the basic structure of blaze configuration having a greater pitch width (or cycle width) and the basic structure of blaze configuration having a smaller pitch width (or cycle width)—are superimposed, at least one of the positions of the level difference (surface approximately perpendicular to the base surface) of the basic structure having a greater pitch width (or cycle width) preferably does not agree with the position of the level difference of the basic structure having a smaller pitch width (or cycle width). To put it another way, the mutual level differences are preferably displaced to ensure that the cycle of the greater basic structure does not agree with the integral multiple of the cycle of the smaller basic structure. This superimposition preferably allows the trace of the above-mentioned blaze configuration to be maintained.

At least one optical surface of the objective lens preferably has a central region and a peripheral region around the central region. More preferably, at least one optical surface of the objective lens has the outermost peripheral region around the peripheral region. Provision of the outermost peripheral region ensures more approximate recording and/or reproduction to be performed using an optical information recording medium of high NA. The central region is preferably the region including the optical axis of the objective lens, but it can be the region that does not include the optical axis of the objective lens. The central, peripheral and outermost peripheral regions are preferably formed on one and the same optical surface. Preferably, the central region CN, peripheral region MD and outermost peripheral region OT are concentrically arranged about the center on one and the same optical surface, as shown in FIG. 4. The basic structure as the optical path difference providing structure is formed on the central region of the objective lens. Preferably the basic structure as the optical path difference providing structure is formed on the peripheral region as well. When the outermost peripheral region is provided, it can be a refracted surface. The basic structure as the optical path difference providing structure can be formed on the outermost peripheral region. The central, peripheral and outermost peripheral regions are preferably adjacent with one another, and a slight clearance can be present among these regions.

The objective lens preferably ensures that the first, second and third light fluxes passing through the central region of the objective lens are converged so that each of these fluxes will form a convergent spot. More preferably, the objective lens ensures the first light flux passing through the central region of the objective lens is converged so that information can be recorded and/or reproduced on the information recording surface of the first optical information recording medium. The objective lens ensures the second light flux passing through the central region of the objective lens is converged so that information can be recorded and/or reproduced on the information recording surface of the second optical information recording medium. The objective lens ensures the third light flux passing through the central region of the objective lens is converged so that information can be recorded and/or reproduced on the information recording surface of the third optical information recording medium. If there is a difference between the thickness t1 of the protective substrate of the first optical information recording medium and thickness t2 of the protective substrate of the second optical information recording medium, at least one of the basic structures formed on the central region preferably corrects for the first and second light fluxes passing through the basic structure. The spherical aberration resulting from the difference between the thickness t1 of the protective substrate of the first optical information recording medium and thickness t2 of the protective substrate of the second optical information recording medium, and/or the spherical aberration resulting from the difference of the wavelengths between the first and second light fluxes. Further, at least one of the basic structures formed on the central region preferably corrects for the first and third light fluxes passing through the basic structure. The spherical aberration resulting from the difference between the thickness t1 of the protective substrate of the first optical information recording medium and thickness t3 of the protective substrate of the third optical information recording medium, and/or the spherical aberration resulting from the difference of the wavelengths between the first and third light fluxes.

Of the spots formed by the third light flux passing through the central region of the objective lens, the spot having the greatest amount of light is assumed as the first best focus, and the spot having the second greatest amount of light is assumed as the second best focus. Namely, in the third light flux passing through the central region, the diffracted light having the greatest amount of light forms the first best focus, and the diffracted light having the second greatest amount of light forms the second best focus. Preferably, the diffracted light having the smallest spot diameter forms the first best focus, and the diffracted light having the second smallest spot diameter forms the second best focus.

It is preferred that, in the first best focus, the spot formed by the third light flux will be used for recording and/or reproducing into/from the third optical information recording medium, and in the second best focus, the spot formed by the third light flux will not be used for recording and/or reproducing into/from the third optical information recording medium. It is also possible to make such arrangements that, in the first best focus, the spot formed by the third light flux will not be used for recording and/or reproducing into/from the third optical information recording medium, and in the second best focus, the spot formed by the third light flux will be used for recording and/or reproducing into/from the third optical information recording medium. If the first optical path difference providing structure is provided on the light source side of the objective lens, the second best focus is preferably closer to the objective lens than the first best focus.

The first and second best focuses meet the following expression (3):

$$0.05 \leq L/f \leq 0.35 \qquad (3)$$

wherein f[mm] indicates the focal distance of the objective lens of the third light flux when the third light flux passing through the first optical path difference providing structure has the third light flux forming the first best focus; and L[mm] denotes the distance between the first best focus and second best focus.

The following expression (3)' is preferably met:

$$0.10 \leq L/f \leq 0.25 \qquad (3)'$$

The following expression (3)″ is more preferably met:

$$0.11 \leq L/f \leq 0.24 \qquad (3)''$$

L is preferably 0.18 mm or more without exceeding 0.63 mm, and f is preferably 1.8 mm or more without exceeding 3.0 mm.

If requirements of the lower limits of the expressions (3), (3)' and (3″) are satisfied, when recording and/or reproducing on the third optical information recording medium, the unwanted light of the third light flux not used for recording and/or reproducing into/from the third optical information recording medium can be prevented from adversely affecting the light receiving element for tracking, at the time of recording and/or reproducing into/from the third optical information recording medium. Meeting the requirements of the upper limits of the expressions (3), (3)' and (3") makes it possible to increase the pitch of the basic structure for determining the distance L between the first and second best focuses.

A plurality of types of basic structures can be arranged in the form superimposed on the central region of the objective lens.

The objective lens converts the first and second light fluxes passing through the peripheral region of the objective lens in such a way as to form convergent spots. Preferably, the objective lens converges the first light flux passing through the peripheral region of the objective lens so as to permit recording and/or reproducing of information into/from the information recording surface of the first optical information recording medium. Further, the objective lens converges the second light flux passing through the peripheral region of the objective lens so as to permit recording and/or reproducing of information into/from the information recording surface of the second optical information recording medium. If there is a difference between the thickness t1 of the protective substrate of the first optical information recording medium and the thickness t2 of the protective substrate of the second optical information recording medium, at least one of two basic structures arranged in the peripheral region preferably works on the first light flux and the second light flux passing through the relevant basic structure to correct the spherical aberration resulting from the difference between the thickness t1 of the protective substrate of the first optical information recording medium and the thickness t2 of the protective substrate of the second optical information recording medium, and/or the spherical aberration resulting from the difference in the wavelengths of the first and second light fluxes.

In one example of the preferred embodiment that can be mentioned, the third light flux having passed through the peripheral region is not used for recording and/or reproducing into/from the third optical information recording medium. Means are preferably provided to make sure the third light flux having passed through the peripheral region does not contribute to the formation of the convergent spot on the information recording surface of the third optical information recording medium. To be more specific, the third light flux passing through the peripheral region of the objective lens provided with at least one type of the basic structure preferably forms a flare on the information recording surface of the third optical information recording medium. In the spot to be formed on the information recording surface of the third optical information recording medium, the spot center with high light density, the spot intermediate portion with the light density lower than that of the spot center, and the spot peripheral portion with the light density higher than that of the spot intermediate portion and lower than that of the spot center are preferably provided in that order as one goes from the side of the optical axis (or spot center) toward the outside. The spot center portion is used for recording and/or reproducing information into/from the optical information recording medium, and the spot intermediate and peripheral portions are not used for recording and/or reproducing information into/from the optical information recording medium. This spot peripheral portion in the above description is called the flare. To be more specific, the third light flux having passed through the peripheral region of the objective lens containing at least one basic structure forms a spot peripheral portion on the information recording surface of the third optical information recording medium. It should be noted that the convergent spot or spot of the third light flux in this context is preferably the spot in the first best focus. Further, in the second light flux having passed through the objective lens the spot formed on the information recording surface of the second optical information recording medium preferably contains a spot center, spot intermediate portion and peripheral portion.

When the objective lens includes the outermost peripheral region, the objective lens converges the first light flux passing through the outermost peripheral region of the objective lens in such a way that information can be recorded or reproduced into/from the information recording surface of the first optical information recording medium. Further, in the first light flux having passed through the outermost peripheral region, it is preferred that the spherical aberration should have already been corrected at the time of recording and/or reproducing into/from the first optical information recording medium.

In another example of the preferred embodiments, the second light flux having passed through the outermost peripheral region is not used for recording and/or reproducing into/from the second optical information recording medium, and the third light flux having passed through the outermost peripheral region is not used for recording and/or reproducing into/from the third optical information recording medium. Means are preferably provided to make sure that the second and third light fluxes having passed through the outermost peripheral portion do not contribute to the formation of a convergent spot on the information recording surfaces of the second and third optical information recording media. To be more specific, when the objective lens includes the outermost peripheral region, the third light flux passing through the outermost peripheral region of the objective lens preferably forms a flare on the information recording surface of the third optical information recording medium. To put it another way, the third light flux having passed through the outermost peripheral region of the objective lens preferably forms a spot peripheral portion on the information recording surface of the third optical information recording medium. When the objective lens includes the outermost peripheral region, the second light flux passing through the outermost peripheral region of the objective lens preferably forms a flare on the information recording surface of the second optical information recording medium. To put it another way, the second light flux having passed through the outermost peripheral region of the objective lens preferably forms a spot peripheral portion on the information recording surface of the second optical information recording medium.

The following describes an example of the basic structure. For example, the basic structure A is an optical path difference providing structure for ensuring that the amount of diffracted light on the second order of the first light flux having passed through the basic structure A is greater than that of the diffracted light on any other order; the amount of diffracted light on the first order of the second light flux is greater than that of the diffracted light on any other order; and the amount of diffracted light on the first order of the third light flux is greater than that of the diffracted light on any other order. The basic structure A is an optical path difference providing structure for ensuring, preferably, that the first and third light fluxes having passed through the basic structure A are outputted with the wave front almost in a complete form, and the second light flux having passed through the basic structure A is outputted without the wave front in a complete form. Further, the basic structure A is preferably the optical path difference providing structure for ensuring that the diffraction angle of the second light flux having passed through the basic structure A is different from the diffraction angles of the first and third light fluxes. The amount of level difference (pitch depth) of the basic structure A in the direction of the optical axis is preferred to provide the first light flux with the optical path difference corresponding to approximately two by the first wavelength, the second light flux with the optical path difference corresponding to approximately 1.2 by the second wavelength, and the third light flux with the optical path difference corresponding to approximately one by the third wavelength.

In another example of the basic structure, the basic structure B is an optical path difference providing structure for ensuring that the amount of diffracted light on the O-order (transmission light) of the first light flux having passed through the basic structure B is greater than that of the diffracted light on any other order; the amount of diffracted light on the O-order (transmission light) of the second light flux is greater than that of the diffracted light on any other order; and the amount of diffracted light on the ±first-order of the third light flux is greater than that of the diffracted light on any other order. The basic structure B is an optical path difference providing structure for ensuring, preferably, that the first and second light fluxes having passed through the basic structure B are outputted with the wave front almost in a complete form, and the third light flux having passed through the basic structure B is outputted without the wave front in a complete form. Further, the basic structure B is preferably the optical path difference providing structure for ensuring that the diffraction angle of the third light flux having passed through the basic structure B is different from the diffraction angles of the first and second light fluxes. The amount of level difference of the basic structure B in the direction of the optical axis is preferred to provide the first light flux with the optical path difference corresponding to approximately five by the first wavelength, the second light flux with the optical path difference corresponding to approximately three by the second wavelength, and the third light flux with the optical path difference corresponding to approximately 2.5 by the third wavelength. Further, the configuration of the basic structure B is preferably binary, as shown in FIG. 3d.

The basic structure C is an optical path difference providing structure for ensuring that the amount of diffracted light on the first order of the first light flux having passed through the basic structure C is greater than that of the diffracted light on any other order; the amount of diffracted light on the first order of the second light flux is greater than that of the diffracted light on any other order; and the amount of diffracted light on the first order of the third light flux is greater than that of the diffracted light on any other order. The amount of level difference of the basic structure C in the direction of the optical axis is preferred to provide the first light flux with the optical path difference corresponding to approximately one by the first wavelength, the second light flux with the optical path difference corresponding to approximately 0.6 by the second wavelength, and the third light flux with the optical path difference corresponding to approximately 0.5 by the third wavelength.

The basic structure D is an optical path difference providing structure for ensuring that the amount of diffracted light on the third order of the first light flux having passed through the basic structure D is greater than that of the diffracted light on any other order; the amount of diffracted light on the second order of the second light flux is greater than that of the diffracted light on any other order; and the amount of diffracted light on the second order of the third light flux is greater than that of the diffracted light on any other order. The amount of level difference of the basic structure D in the direction of the optical axis is preferred to provide the first light flux with the optical path difference corresponding to approximately three by the first wavelength, the second light flux with the optical path difference corresponding to approximately 1.9 by the second wavelength, and the third light flux with the optical path difference corresponding to approximately 1.6 by the third wavelength.

The basic structure E is an optical path difference providing structure for ensuring that the amount of diffracted light on the tenth order of the first light flux having passed through the basic structure E is greater than that of the diffracted light on any other order; the amount of diffracted light on the sixth order of the second light flux is greater than that of the diffracted light on any other order; and the amount of diffracted light on the fifth order of the third light flux is greater than that of the diffracted light on any other order. The amount of level difference of the basic structure E in the direction of the optical axis is preferred to provide the first light flux with the optical path difference corresponding to approximately ten by the first wavelength, the second light flux with the optical path difference corresponding to approximately six by the second wavelength, and the third light flux with the optical path difference corresponding to approximately five by the third wavelength.

The basic structure F is an optical path difference providing structure for ensuring that the amount of diffracted light on the fifth order of the first light flux having passed through the basic structure F is greater than that of the diffracted light on any other order; the amount of diffracted light on the third order of the second light flux is greater than that of the diffracted light on any other order; and the amount of diffracted light on the third and second orders of the third light flux are greater than that of the diffracted light on any other order. In the third light flux, the amount of diffracted light on the third order is preferably slightly greater than that of the diffracted light on the second order. The amount of level difference of the basic structure F in the direction of the optical axis is preferred to provide the first light flux with the optical path difference corresponding to approximately five by the first wavelength, the second light flux with the optical path difference corresponding to approximately three by the second wavelength, and the third light flux with the optical path difference corresponding to approximately 2.5 by the third wavelength.

The basic structure G is an optical path difference providing structure for ensuring that the amount of diffracted light on the second order of the first light flux having passed through the basic structure G is greater than that of the diffracted light on any other order; the amount of diffracted light on the first order of the second light flux is greater than that of the diffracted light on any other order; and the amount of diffracted light on the first order of the third light flux is greater than that of the diffracted light on any other order. The amount of level difference of the basic structure G in the direction of the optical axis is preferred to provide the first light flux with the optical path difference corresponding to approximately two by the first wavelength, the second light flux with the optical path difference corresponding to approximately 1.2 by the second wavelength, and the third light flux with the optical path difference corresponding to approximately one by the third wavelength.

The basic structures E, F and G have a function of reducing the spherical aberration when the wavelengths of the first, second and third light sources have been increased by a rise in temperature. This arrangement corrects the excessive spherical aberration resulting from the reduction in refractive index of the plastics at the time of temperature rise, and ensures high-quality spherical aberration. The basic structures F and G allow the level difference to be made smaller than the basic structure E. The basic structures E, F and G are preferably provided on the basic aspherical surface (base surface) different from basic structures A, B, C and D. The basic structures E, F and G are preferably located on the basic aspherical surface (base surface) arranged so as to ensure that the basic structures E, F and G do not affect the orientation of the incoming light flux whenever possible, while providing the incoming light flux with the above-mentioned optical path difference. Further, the basic structures E, F and G are preferably designed in such a way that, as one goes away from the optical axis in the direction perpendicular to the optical axis, one goes inside the optical element, and, from a certain point as a borderline, as one goes away from the optical axis, one goes outside the optical element. (To put it another way, the depth is increased gradually, and until a certain point is reached. After that, the depth continues to reduce).

When the objective lens is a plastic lens, one of the preferred embodiments is the arrangement wherein the central region is designed in a superimposition configuration wherein at least two types of basic structures are superimposed. Another preferred embodiment is the triple superimposition configuration wherein three types of basic structures are superimposed. To put it more specifically, another preferred embodiment is the triple superimposition configuration composed of the basic structure E, F or G superimposed on the basic structures A and B. A more preferred embodiment is the superimposition configuration composed of the basic structure E superimposed on the basic structures A and B. In a further preferred embodiment, when means are provided to ensure that:

the amount of diffracted light on the a-order (wherein "a" is an integer) of the first light flux having passed through the basic structure is greater than that of the diffracted light on any other order;

the amount of diffracted light on the b-order (wherein "b" is an integer) of the second light flux is greater than that of the diffracted light on any other order; and the amount of diffracted light on the c-order (wherein "c" is an integer) of the third light flux having passed through the basic structure is greater than that of the diffracted light on any other order;

then the central region is provided with the basic structure wherein at least one of a, b and c is a positive integer, and at least one of a, b and c is a negative integer, and the basic structures E, F or G are superimposed on one another to form a superimposition structure.

When the objective lens is a plastic lens, the peripheral region can be provided with a structure formed by superimposition of any one of the basic structures E, F and G on any one of the basic structures A, C and D. Preferably, the peripheral region is provided with a structure formed by superimposition of the basic structure A on the basic structure F. In a further preferred embodiment to be mentioned, when means are provided to ensure that:

the amount of diffracted light on the a-order (wherein "a" is an integer) of the first light flux having passed through the basic structure is greater than that of the diffracted light on any other order;

the amount of diffracted light on the b-order (wherein "b" is an integer) of the second light flux is greater than that of the diffracted light on any other order; and the amount of diffracted light on the c-order (wherein "c" is an integer) of the third light flux having passed through the basic structure is greater than that of the diffracted light on any other order;

then the peripheral region is provided with the basic structure wherein at least one of a, b and c is a positive integer, and at least one of a, b and c is a negative integer, and the basic structures E, F or G are superimposed on one another to form a superimposition structure.

When the objective lens is a plastic lens, the outermost peripheral region is preferably provided with any one of the basic structures E, F and G. Preferably, the outermost peripheral region is provided with the basic structure F.

When the objective lens is a glass lens, the lens is preferably provided with the outermost peripheral region as a refractive surface.

Assume that NA1 is the numerical aperture of the objective lens on the image side required for recording and/or reproducing information into/from the first optical information recording medium; NA2 ($NA1 \geq NA2$) is the numerical aperture of the objective lens on the image side required for recording and/or reproducing information into/from the second optical information recording medium; and NA3 ($NA2 > NA3$) is the numerical aperture of the objective lens on the image side required for recording and/or reproducing information into/from the third optical information recording medium. In this case, it is preferred that NA1 should be 0.8 or more without exceeding 0.9, or 0.55 or more without exceeding 0.7. The NA1 is particularly preferred to be 0.85. The NA2 is preferably 0.55 or more without exceeding 0.7. The NA2 is particularly preferred to be 0.60. The NA3 is preferably 0.4 or more without exceeding 0.55. The NA3 is particularly preferred to be 0.45 or 0.53.

The boundary between the central and peripheral regions of the objective lens is preferably formed on the portion corresponding to the range of 0.9·NA3 or more without exceeding 1.2·NA3 (more preferably 0.95·NA3 or more without exceeding 1.15·NA3), when the third light flux is used. More preferably, the boundary between the central and peripheral regions of the objective lens is formed on the portion corresponding to NA3. The boundary between the central and outermost peripheral regions of the objective lens is preferably formed on the portion corresponding to the range of 0.9·NA2 or more without exceeding 1.2·NA2 (more preferably 0.95·NA2 or more without exceeding 1.15·NA2), when the second light flux is used. More preferably, the boundary between the central and outer peripheral regions of the objective lens is formed on the portion corresponding to NA2. The boundary on the outside of the outermost peripheral region of the objective lens is preferably formed on the portion corresponding to the range of 0.9·NA1 or more without exceeding 1.2·NA1 (more preferably 0.95·NA1 or more without exceeding 1.15·NA1), when the first light flux is used. More preferably, the boundary on the outside of the outermost peripheral region of the objective lens is formed on the portion corresponding to NA1.

It is also possible to make such arrangements that the utilization efficiency of any two of the first through third light fluxes is 80% or more, and the utilization efficiency of the remaining light flux is 30% or more without exceeding 80%. Further, the utilization efficiency of the remaining light flux can be 40% or more without exceeding 70%. In this case, the third light flux is preferably used as the light flux wherein the light utilization efficiency is 30% or more without exceeding 80% (or 40% or more without exceeding 70%).

The light utilization efficiency in the sense in which it is used here can be calculated by A/B wherein A is the amount of light inside the area disk of the convergent spot formed on the information recording surface of the optical information recording medium by the objective lens provided with the first and second optical path difference providing structures (or the third optical path difference providing structure); and B is the amount of light inside the area disk of the convergent spot formed on the information recording surface of the optical information recording medium by the objective lens not provided with the first, second or third optical path difference providing structures, this objective lens being made of the same material characterized by the same focal distance, on-axis thickness, numerical aperture and wavefront aberration. The area disk in the sense in which it is used here refers to the circle of convergent spot wherein the radius is represented by $r'=0.61 \cdot \lambda/NA$.

The first, second and third light fluxes can be inputted into the objective lens as parallel light, divergent light or convergent light. When the first light flux is inputted into the objective lens, the magnification m1 of the objective lens preferably meets the following expression (4):

$$-0.01 < m1 < 0.01 \quad (4)$$

In the meantime, in cases wherein the first light flux as divergent light is inputted into the objective lens, the following expression (4') is preferably met by the magnification m1 of the objective lens when the first light flux enters the objective lens:

$$-0.10 < m1 < 0.00 \quad (4')$$

In cases wherein the second light flux as parallel or approximately parallel light is inputted into the objective lens, the following expression (5) is preferably met by the magnification m2 of the light flux of the objective lens when the second light flux enters the objective lens:

$$-0.01 < m2 < 0.01 \quad (5)$$

In the meantime, in cases wherein the second light flux as divergent light is inputted into the objective lens, the following expression (5') is preferably met by the magnification m2 of the objective lens when the second light flux enters the objective lens:

$$-0.10 < m2 < 0.00 \quad (5')$$

In cases wherein the third light flux as parallel or approximately parallel light is inputted into the objective lens, the following expression (6) is preferably met by the magnification m3 of the light flux of the objective lens when the third light flux enters the objective lens:

$$-0.01 < m3 < 0.01 \quad (6)$$

In the meantime, in cases wherein the third light flux as divergent light is inputted into the objective lens, the following expression (6') is preferably met by the magnification m3 of the objective lens when the third light flux enters the objective lens:

$$-0.10 < m3 < 0.00 \quad (6')$$

When the third optical information recording medium is used, the working distance (WD) of the objective lens is preferably 0.20 mm or more without exceeding 1.5 mm, more preferably 0.3 mm or more without exceeding 1.00 mm. When the second optical information recording medium is used, the working distance (WD) of the objective lens is preferably 0.4 mm or more without exceeding 0.7 mm. When the first optical information recording medium is used, the working distance (WD) of the objective lens is preferably 0.4 mm or more without exceeding 0.9 mm (0.6 mm or more without exceeding 0.9 mm when t1<t2).

When the first optical information recording medium is used, the diameter of the entrance pupil of the objective lens is preferably φ2.8 mm or more without exceeding φ4.5 mm.

The optical information recording/reproducing medium of the present invention is equipped with an optical information recording medium drive apparatus including the above-mentioned optical pickup apparatus.

The following describes the optical information recording medium drive apparatus mounted on the optical information recording/reproducing medium. The optical information recording medium drive apparatus is available in two types. One is a drive apparatus wherein only the tray capable of holding the optical information recording medium mounted thereon is taken out from the optical information recording/reproducing medium body incorporating an optical pickup apparatus and others. The other is the drive apparatus that is taken out together with the optical information recording medium drive apparatus body incorporating an optical pickup apparatus and others.

The optical information recording/reproducing apparatus is generally provided with the following component members, without the present invention being restricted thereto. The component members are:

an optical pickup apparatus incorporated in the housing and others;

a drive source of the optical pickup apparatus such as a seek motor for moving the optical pickup apparatus together with the housing toward the inner periphery or outer periphery of the optical information recording medium;

an optical pickup apparatus transporting device equipped with a guide rail for guiding the housing of the optical pickup apparatus toward the inner periphery or outer periphery of the optical information recording medium; and a spindle motor for driving the optical information recording medium.

The optical information recording medium drive apparatus of the former type is equipped with a tray capable of holding the optical information recording medium mounted thereon, and a loading mechanism for sliding the tray, in addition to the above-mentioned component members. Preferably, the optical information recording medium drive apparatus of the latter type is equipped with a drawer corresponding to a chassis for permitting the component members to be taken out, but is not provided with a tray or loading mechanism.

Effects of the Invention

The present invention provides an objective lens for an optical pickup apparatus and an optical pickup apparatus using the same, wherein the diffracted light produced by the optical path difference providing structure is converged as a spot on the information recording surface of the optical information recording medium, and the above-mentioned objective lens is capable of reducing the diffraction efficiency resulting from a change in the wavelength used. In particular, the present invention to provide an objective lens for optical pickup apparatus and an optical pickup apparatus using same, wherein the objective lens is a diffraction type compatible objective lens using the blue-violet laser light, red laser light and infrared laser light, and the diffraction efficiency resulting from a change in the wavelength used is minimized.

DESCRIPTION OF REFERENCE NUMERALS

Figure 1:
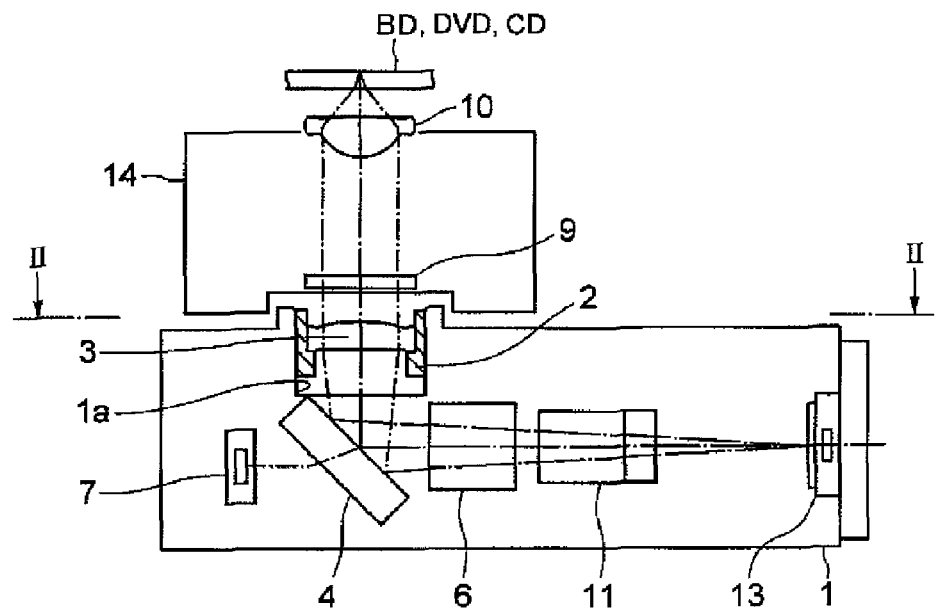
FIG. 1 is a cross sectional view schematically representing an optical pickup apparatus as an embodiment of the present invention.

1. Housing
2. Holder
3. Collimating lens
3a. Lens portion
3b. Hollow cylindrical portion
4. Rising mirror
5. Semiconductor laser
6. Polarized beam splitter for blue-violet color
7. Power monitor
9. λ/4 wave plate
10. Objective lens
11. Polarized beam splitter
12. Servo lens
13. Photo detector
14. Actuator
15. Two-laser one-package
16. Coupling laser

BEST MODE FOR CARRYING OUT THE INVENTION

Figure 2:
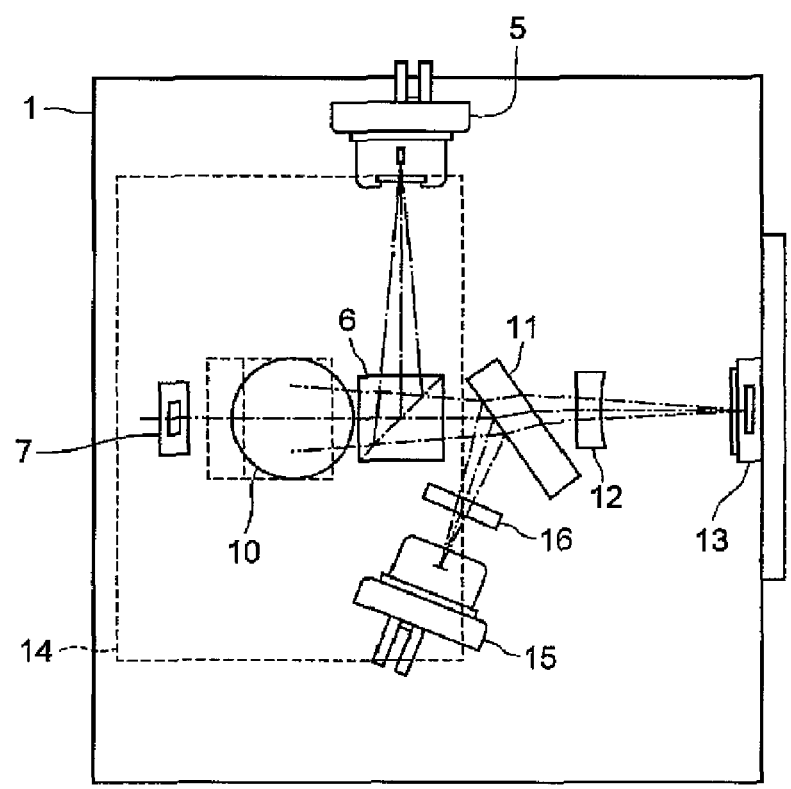
FIG. 2 is a cross sectional view of the structure of FIG. 1 taken along the cutting plane including the line II-II, as observed from the arrow mark.
Figure 3A:
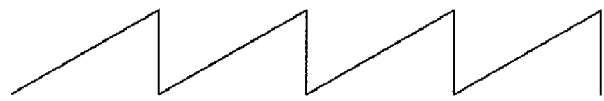
FIG. 3 is a cross sectional view showing the optical path difference providing structure of the objective lens as an embodiment of the present invention.
Figure 3B:
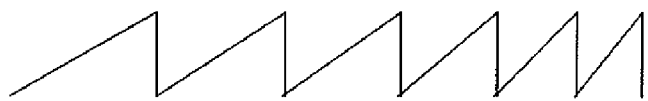
Figure 3C:
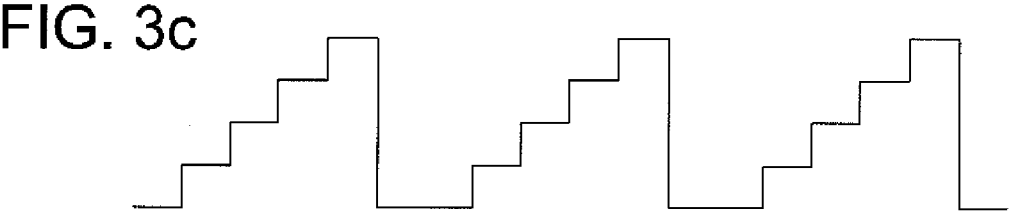
Figure 3D:
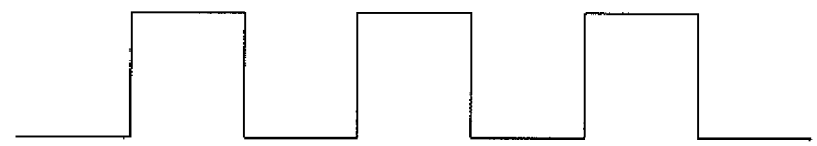

The following gives a more detailed description of the preferred embodiment of the present invention with reference to drawings. FIG. 1 is a cross sectional view schematically representing an optical pickup apparatus as an embodiment of the present invention. FIG. 2 is a cross sectional view of the structure of FIG. 1 taken along the cutting plane including the line II-II, as observed from the arrow mark. The optical pickup apparatus of the present embodiment reproduces information using three types of optical information recording mediums BD (or HD), DVD and CD. The present invention is also applicable to the optical pickup apparatus for reproducing information from two types of optical information recording medium (preferably including the high-density optical information recording medium), and the optical pickup apparatus for recording/reproducing the information using the high-density optical information recording medium.

A plurality of types of basic structures as optical path difference providing structures are formed on the optical surface of the objective lens 10 of the present embodiment. These basic structures meet the following expression:

$$(\lambda\beta-\lambda 1)\times(\lambda\alpha-\lambda 1)<0 \qquad (1)$$

$$4\,\mathrm{nm}\leq|\lambda\alpha-\lambda\beta|\leq 60\,\mathrm{nm} \qquad (2)$$

wherein $\lambda\alpha$ is the wavelengths wherein the diffraction efficiency of a certain basic structure is maximized within the range of wavelength $\lambda 1\pm 50$ nm, and $\lambda\beta$ is the wavelengths wherein the diffraction efficiency of another basic structure is maximized within the range of wavelength $\lambda 1\pm 50$ nm.

The following describes the objective lens 10 having an optical path difference providing structure. The optical surface of the objective lens 10 is provided with a structure formed by superimposition of at least two types of basic structures (first and second basic structures).

The first basic structure is an optical path difference providing structure for ensuring that:

the amount of diffracted light on the r-order (wherein "r" is an integer) of the first light flux having passed through the first basic structure is greater than that of the diffracted light on any other order;

the amount of diffracted light on the s-order (wherein "s" is an integer) of the second light flux is greater than that of the diffracted light on any other order; and the amount of diffracted light on the t-order (wherein "t" is an integer) of the third light flux is greater than that of the diffracted light on any other order.

The second basic structure is the optical path difference providing structure for ensuring that:

the amount of diffracted light on the u-order (wherein "u" is an integer) of the first light flux having passed through the second basic structure is greater than that of the diffracted light on any other order;

the amount of diffracted light on the v-order (wherein "v" is an integer) of the second light flux is greater than that of the diffracted light on any other order; and the amount of diffracted light on the w-order (wherein "w" is an integer) of the third light flux is greater than that of the diffracted light on any other order.

A third basic structure can be superimposed in addition to the first and second basic structures. The third basic structure is designed to ensure that:

the amount of diffracted light on the x-order (wherein "x" is an integer) of the first light flux having passed through the third basic structure is greater than that of the diffracted light on any other order;

the amount of diffracted light on the y-order (wherein "y" is an integer) of the second light flux is greater than that of the diffracted light on any other order; and the amount of diffracted light on the z-order (wherein "z" is an integer) of the third light flux is greater than that of the diffracted light on any other order.

It is preferred that at least one of r, s and t should not be 0 (zero). One or two of r, s and t can be 0. It is preferred that at least one of u, v and w should not be 0. More preferably, none of u, v and w are 0. Preferably, at least one of x, y and z is not zero. More preferably, none of x, y and z are 0.

The following expression is preferably met:

$$r+s+t<u+v+w<x+y+z$$

wherein $r=0$, $s=0$, $t=\pm 1$, $u=2$, $v=1$, $w=1$, $x=10$, $y=6$ and $z=5$, preferably.

The following describes the preferred design method for designing the objective lens 10 of the aspherical surface. In the first place, the aspherical surface as a reference is designed. A design is worked out in such a way that a first basic structure is superimposed on this aspherical surface wherein this first basic structure has the greatest pitch width with the values r, s and t each having been set. For each surface within each pitch width of the first basic structure, a design is worked out in such a way that a second basic structure is superimposed on the first basic structure wherein the second basic structure has the greatest pitch width after that of the first basic structure, with the values u, v and w having been set. For each surface within each pitch width of the first basic structure, a design is worked out in such a way that a third basic structure is superimposed on the first and second basic structures, wherein this third basic structure has the greatest pitch width after that of the second basic structure, with the values x, y and z having been set. If there are fourth and later basic structures, the above-mentioned work procedures should be repeated. As described above, basic structures should be superimposed sequentially starting from the basic structure having a greater pitch width. It should be noted that first, second and third basic structures can be designed separately and can then be superimposed on a reference surface. However, the above-mentioned procedure is preferably used.

Figure 4:
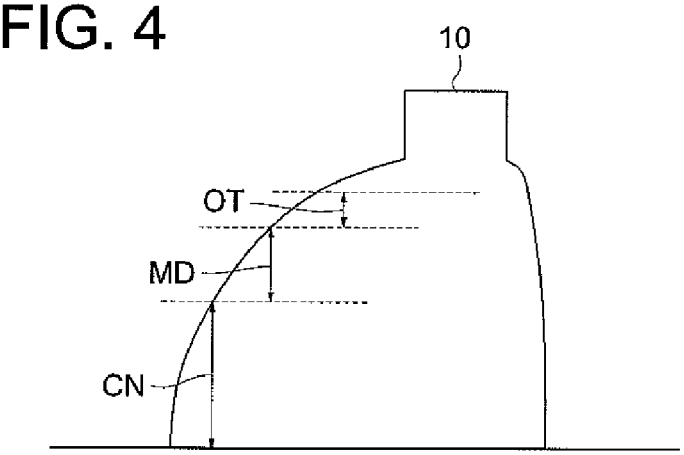
FIG. 4 is a cross sectional view schematically showing an example of the objective lens OBJ in the present invention.

The optical surface of the objective lens 10 includes a central region, a peripheral region around the central region, and an outermost peripheral region around the peripheral region. The central region is the area including the optical axis of an objective lens. As shown in FIG. 4, on one and the same optical surface, the central region CN, peripheral region MD and outermost peripheral region OT are arranged concentrically about the optical axis as a center. The central region of the objective lens 10 is provided with the structure formed by superimposition of the basic structures A, B and E. The peripheral region is provided with the structure formed by superimposition of the basic structures A and F. In the present embodiment, the outermost peripheral region is also provided with basic structure F.

The basic structure on the central region is arranged over the entire surface of the central region. The basic structure on the peripheral region is also arranged over the entire surface of the peripheral region. The basic structure on the outermost peripheral region is also arranged over the entire surface of the outermost peripheral region.

The objective lens 10 ensures that the first, second and third light fluxes passing through the central region of the objective lens 10 are converged so that the respective convergent spots will be formed. Namely, the objective lens 10 converges the first light flux passing through the central portion of the objective lens 10 in such a way that information can be recorded and/or reproduced into/from the information recording surface of the BD. The objective lens 10 converges the second light flux passing through the central portion of the objective lens 10 in such a way that information can be recorded and/or reproduced into/from the information recording surface of the DVD. Further, the objective lens 10 converges the third light flux passing through the central portion of the objective lens 10 in such a way that information can be recorded and/or reproduced into/from the information recording surface of the CD. Since the thickness t1 of the protective substrate of the BD is different from the thickness t2 of the protective substrate of the DVD, at least one basic structure (preferably basic structure A) provided on the central region works on the first and second light fluxes having passed through the aforementioned basic structure, and corrects the spherical aberration produced by the difference between the thickness t1 of the protective substrate of the BD and the thickness t2 of the protective substrate of the DVD, and/or the spherical aberration produced by the difference in wavelength between the first and second light fluxes. Further, at least one basic structure (preferably the basic structure B, although it can be the same as the aforementioned basic structure or can be different) works on the first and third light fluxes having passed through the aforementioned basic structure, and corrects the spherical aberration produced by the difference between the thickness t1 of the protective substrate of the BD and the thickness t3 of the protective substrate of the CD, and/or the spherical aberration produced by the difference in wavelength between the first and third light fluxes.

The first best focus and second best focus are formed by the third light flux having passed through the central region of the objective lens 10.

In the present embodiment, the spot forming the third light flux is used for recording and/or reproducing into/from the CD in the first best focus. In the second best focus, the spot forming the third light flux is not used for recording and/or reproducing into/from the CD.

The objective lens 10 converts the first and second light fluxes passing through the peripheral region of the objective lens 10 in such a way as to form convergent spots. To be more specific, the objective lens 10 converges the first light flux passing through the peripheral region of the objective lens 10 so as to permit recording and/or reproducing information into/from the information recording surface of the BD. Further, the objective lens 10 converges the second light flux passing through the peripheral region of the objective lens so as to permit recording and/or reproducing information into/from the information recording surface of the DVD. Since there is a difference between the thickness t1 of the protective substrate of the BD and the thickness t2 of the protective substrate of the DVD, at least one of the two basic structures arranged in the peripheral region preferably works on the first and second light fluxes passing through the relevant basic structure to correct the spherical aberration resulting from the difference between the thickness t1 of the protective substrate of the BD and the thickness t2 of the protective substrate of the DVD, and/or the spherical aberration resulting from the difference in the wavelengths of the first and second light fluxes.

The third light flux having passed through the peripheral region forms a flare on the information recording surface of the CD, without being used for recording and/or reproducing into/from the CD.

The objective lens 10 converges the first light flux passing through the outermost peripheral region of the objective lens 10 so as to permit recording and/or reproducing of information into/from the information recording surface of the BD.

The second light flux having passed through the outermost peripheral region forms a flare on the information recording surface of the DVD, without being used for recording and/or reproducing into/from the DVD. The third light flux having passed through the outermost peripheral region forms a flare on the information recording surface of the CD, without being used for recording and/or reproducing into/from the CD.

The boundary between the central and peripheral regions of the objective lens 10 is formed on the portion corresponding to NA3. The boundary between the central and outermost peripheral regions of the objective lens 10 is formed on the portion corresponding to NA2. The boundary on the outside of the outermost peripheral region of the objective lens 10 is formed on the portion corresponding to N1.

The following describes the operation of the optical pickup apparatus in the present embodiment. In FIG. 2, when information is to be reproduced from the BD, if light is emitted from the first semiconductor laser 5 as a light source, the emitted laser light flux with a wavelength of $\lambda 1 = 405$ nm is reflected by the polarized beam splitter for blue-violet color 6 and again by the rising mirror 4. However, part of this light is detected by the power monitor 7 as a monitor means through the rising mirror 4. When this intensity is monitored, the intensity of the light coming from the first semiconductor laser 5 is adjusted through a drive circuit (not illustrated). The light flux having been reflected by the rising mirror 4 passes through the λ/4 wave plate 9, and is converted to the information recording surface of the BD through the objective lens 10.

The light flux reflected by the information recording surface of the BD passes through the objective lens 10, λ/4 wave plate 9 and collimating lens 3, and is reflected by the rising mirror 4. This light then passes through the polarized beam splitter for blue-violet color 6 and polarized beam splitter 11 enters the photo detector 13 through the servo lens 12. This signal can be used to reproduce the information from the BD.

The geometrical change of the optical spot on the photo detector 13 and distribution change of its intensity are detected, whereby focusing and tracking are detected. Based on the result of this detection, the objective lens 10 integral with the bobbin can be operated by the actuator 14 to perform focusing and tracking operations, to ensure that the light flux from the first semiconductor laser 5 is formed on the information recording surface of the BD.

When information is to be reproduced from the DVD, light is emitted from the second semiconductor laser inside the two-laser one-package 15. Then the laser light flux with a wavelength of λ2=about 660 nm having been outputted passes through a diffraction grating 16 for CD and is reflected by the polarized beam splitter 11. This light then passes through the polarized beam splitter for blue-violet color 6, and is reflected by the rising mirror 4. However, part of the light passes through the rising mirror 4 and is detected by the power monitor 7. When this intensity is monitored, the intensity of the light coming from the second semiconductor laser is adjusted through a drive circuit (not illustrated). The light flux having been reflected by the rising mirror 4 passes through the λ/4 wave plate 9, and is converted to the information recording surface of the DVD through the objective lens 10.

The light flux reflected by the information recording surface of the DVD passes through the objective lens 10, λ/4 wave plate 9, and collimating lens 3, and is reflected by the rising mirror 4. After passing through the polarized beam splitter for blue-violet color 6 and polarized beam splitter 11, this light flux enters the photo detector 13 through the servo lens 12. This output signal can be used to reproduce the information from the DVD.

The geometrical change of the optical spot on the photo detector 13 and distribution change of its intensity are detected, whereby focusing and tracking are detected. Based on the result of this detection, the objective lens 10 integral with the bobbin can be operated by the actuator 14 to perform focusing and tracking operations, to ensure that the light flux from the second semiconductor laser is formed on the information recording surface of the DVD.

When information is to be reproduced from the CD light is emitted from the third semiconductor laser inside the two-laser one-package 15. Then the laser light flux with a wavelength of λ3=about 785 nm having been outputted is inputted into the diffraction grating 16 for CD to produce the ±first-order diffracted light for the tracking signal. This laser light flux is reflected by the polarized beam splitter 11. This light then passes through the polarized beam splitter for blue-violet color 6, and is reflected by the rising mirror 4. However, part of the light passes through the rising mirror 4 and is detected by the power monitor 7. When this intensity is monitored, the intensity of the light coming from the third semiconductor laser is adjusted through a drive circuit (not illustrated). The light flux having been reflected by the rising mirror 4 passes through the λ/4 wave plate 9, and is converted to the information recording surface of the CD through the objective lens 10.

The light flux reflected by the information recording surface of the CD passes through the objective lens 10, λ/4 wave plate 9, and collimating lens 3, and is reflected by the rising mirror 4. After passing through the polarized beam splitter for blue-violet color 6 and polarized beam splitter 11, this light flux enters the photo detector 13 through the servo lens 12. This output signal can be used to reproduce the information from the CD.

The geometrical change of the optical spot on the photo detector 13 and distribution change of its intensity are detected, whereby focusing and tracking are detected. Based on the result of this detection, the objective lens 10 integral with the bobbin can be operated by the actuator 14 to perform focusing and tracking operations, to ensure that the light flux from the third semiconductor laser is formed on the information recording surface of the CD.

Embodiment

Figure 5A:
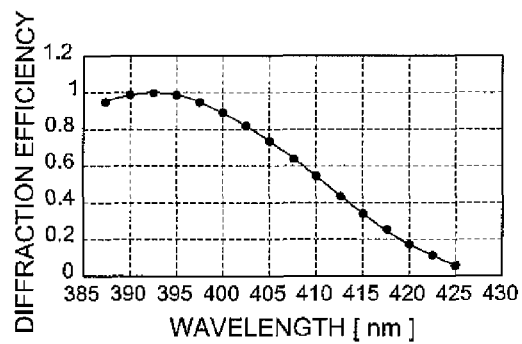
FIG. 5 is a diagram representing the dependency of the first basic structure on wavelength (a), the dependency of the second basic structure on wavelength (b), the dependency of the third basic structure on wavelength (c), and the total dependency on wavelength (d) in a comparative example, wherein diffraction efficiency is plotted on the vertical axis and wavelength on the horizontal axis.
Figure 5B:
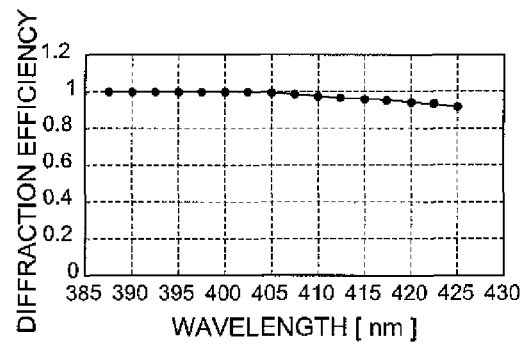
Figure 5C:
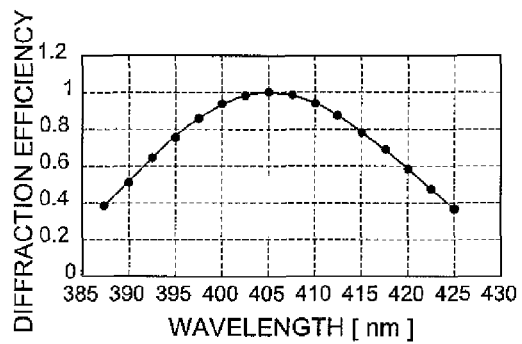
Figure 5D:
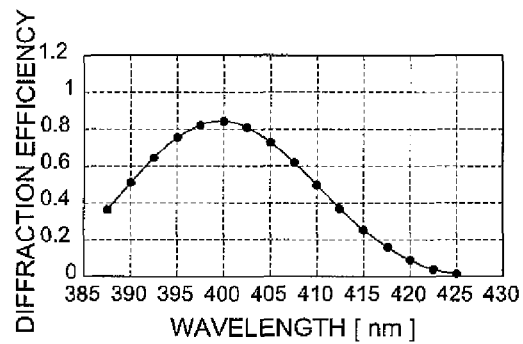

The present inventors have studied the embodiment with reference to a plurality of types of basic structures superimposed on the central region of the objective lens 10 used in the aforementioned embodiment, in comparison with the following Comparative Example. The central region includes a structure formed by superimposition of the aforementioned basic structure B (hereinafter referred to as "first basic structure"), basic structure A (hereinafter referred to as "second basic structure") and basic structure E (hereinafter referred to as "third basic structure"). Since the first and third basic structures provide the level difference that provides the optical path difference corresponding to more than four by wavelength λ1, assume that λα is the wavelength wherein the diffraction efficiency of the first basic structure is maximized, and λβ is the wavelength wherein the diffraction efficiency of the third basic structure is maximized. As shown in FIG. 5a, the first basic structure is designed so that the wavelength (λα) wherein the diffraction efficiency is maximized is 392.5 nm. The second basic structure is designed so that the wavelength wherein the diffraction efficiency is maximized is 395 nm, as shown in FIG. 5b. The third basic structure is designed so that the wavelength (λβ) wherein the diffraction efficiency is maximized is 405 nm, as shown in FIG. 5c. This will yield |λα−λβ|=12.5 nm. Further, λ1=405 nm, hence the value (λβ−λ1)×(λα−λ1) is 0 (zero). This embodiment represents the Comparative example that is outside the scope of the present invention. FIG. 5a shows the result of calculating the first basic structure when the wavelength (blazed wavelength) with maximized diffraction efficiency is 392.5 nm. FIG. 5b shows the result of calculating the second basic structure when the wavelength (blazed wavelength) with maximized diffraction efficiency is 395 nm. FIG. 5c shows the result of calculating the third basic structure when the wavelength (blazed wavelength) with maximized diffraction efficiency is 405 nm. The diffraction efficiency of the first optical path difference providing structure as a whole made up of the first, second and third basic structures is the result of multiplying the diffraction efficiencies of the first, second and third basic structures. Thus, the wavelength dependency is as shown in FIG. 5d. As will be apparent from these figures, the wavelength dependency of the first optical path difference providing structure as a whole is sharp due to the greater wavelength dependency of the first and third basic structures using the deeper level differences. Particularly in this example, when the wavelength has shifted toward the level higher than that of the wavelength being used there will be much reduction in the diffraction efficiency. Thus, since the average value (λ1) of the wavelength of the outgoing light from the blue-violet semiconductor laser is about 405 nm, the diffraction efficiency of the first optical path difference providing structure as a whole exhibits a fluctuation of 4 points with respect to the wavelength change of 1 nm. In this case, no advantage is obtained by shifting the wavelength wherein the diffraction efficiency of the first basic structure is maximized, and the wavelength wherein the diffraction efficiency of the second basic structure is maximized. Thus, a step is taken to shift the wavelength wherein the diffraction efficiency of the third basic structure is maximized.

Figure 6A:
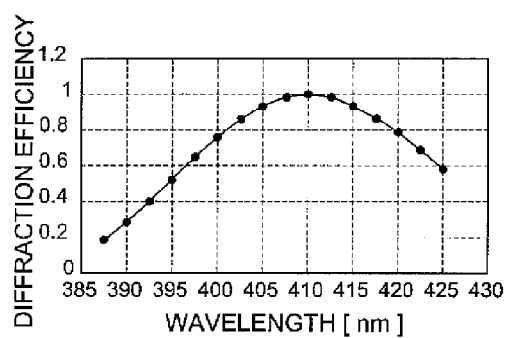
FIG. 6 is a diagram representing the dependency of the third basic structure on wavelength (a) and the total dependency on wavelength (b) in the first embodiment.
Figure 6B:
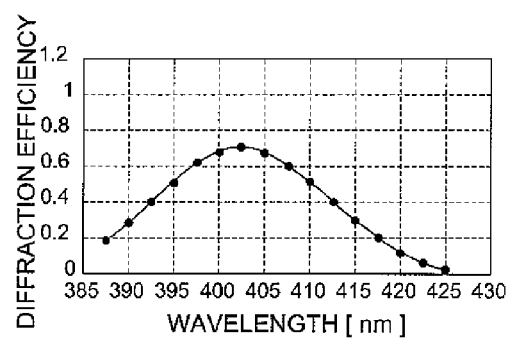

In the Embodiment 1, the first and second basic structures are jointly used, and the third basic structure is designed in such a way that the wavelength (4) wherein the diffraction efficiency is maximized is 410 nm, as shown in FIG. 6a. This will yield |λα−λβ|=17.5 nm. Further, the value (λβ−λ1)×(λα−λ1) is −62.5, which is smaller than 0. Accordingly, this example is included in the embodiments of the present invention. FIG. 6a shows the result of calculating the third basic structure when the wavelength (blazed wavelength) wherein the diffraction efficiency is maximized is 410 nm. The total diffraction efficiency in the first optical path difference providing structure formed by superimposition of these three basic structures corresponds to the value obtained by multiplying three diffraction efficiencies—the diffraction efficiency of the first basic structure shown in FIG. 5a, diffraction efficiency of the second basic structure shown in FIG. 5b, and diffraction efficiency of the third basic structure shown in FIG. 6a. The result of this calculation is given in FIG. 6b. Accordingly, the wavelength wherein the total diffraction efficiency of the first optical path difference providing structure formed by superimposition of the three basic structures is 402 nm, as shown in FIG. 6b. The fluctuation of the diffraction efficiency at the 405 nm wavelength of the blue-violet semiconductor laser beam is recovered by two points with respect to the wavelength fluctuation of 1 nm.

Figure 7A:
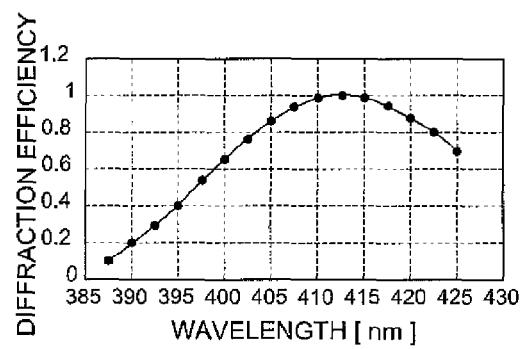
FIG. 7 is a diagram representing the dependency of the third basic structure on wavelength (a) and the total dependency on wavelength (b) in the second embodiment.
Figure 7B:
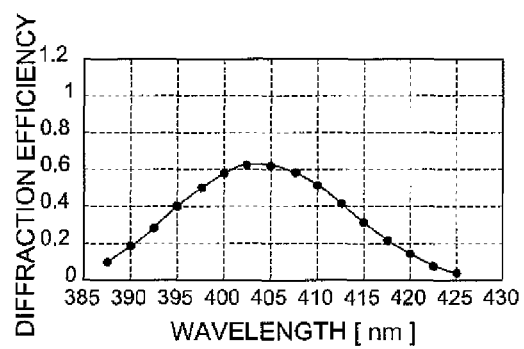

Similarly, in the Embodiment 2, the first and second basic structures are jointly used, and the third basic structure is designed in such a way that the wavelength (λβ) wherein the diffraction efficiency is maximized is 412.5 nm, as shown in FIG. 7a. This will yield |λα−λβ|=20 nm. Further, the value (λβ−λ1)×(λα−λ1) is −93.75, which is smaller than 0. Accordingly, this example is included in the embodiments of the present invention. FIG. 7a shows the result of calculating the third basic structure when the wavelength (blazed wavelength) wherein the diffraction efficiency is maximized is 412.5 nm. The total diffraction efficiency in the first optical path difference providing structure formed by superimposition of them corresponds to the value obtained by multiplying three diffraction efficiencies—the diffraction efficiency of the first basic structure shown in FIG. 5a, diffraction efficiency of the second basic structure shown in FIG. 5b, and diffraction efficiency of the third basic structure shown in FIG. 7a. The result of this calculation is given in FIG. 7b. Accordingly, the wavelength wherein the total diffraction efficiency of the first optical path difference providing structure formed by superimposition of the three basic structures is 404 nm, as shown in FIG. 7b. The fluctuation of the diffraction efficiency at the 405 nm wavelength of the blue-violet semiconductor laser beam is recovered by one point with respect to the wavelength fluctuation of 1 nm.

Figure 8A:
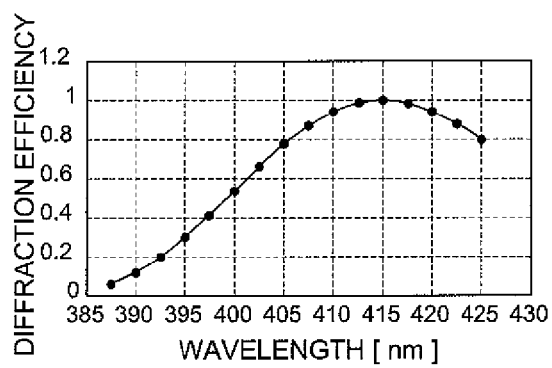
FIG. 8 is a diagram representing the dependency of the third basic structure on wavelength (a) and the total dependency on wavelength (b) in the third embodiment.
Figure 8B:
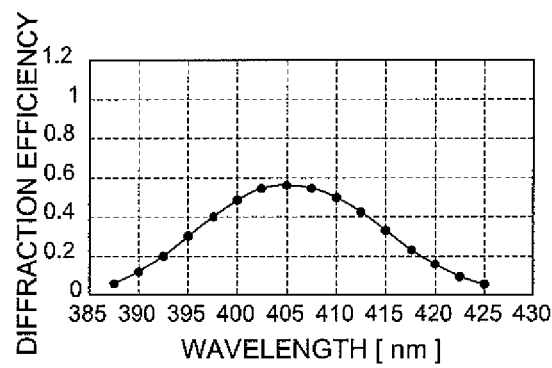

Similarly, in the Embodiment 3, the first and second basic structures are jointly used, and the third basic structure is designed in such a way that the wavelength (λβ) wherein the diffraction efficiency is maximized is 415 nm, as shown in FIG. 8a. This will yield |λα−λβ|=22.5 nm. Further, the value (λβ−λ1)×(λα−λ1) is −125, which is smaller than 0. Accordingly, this example is included in the embodiments of the present invention. FIG. 8a shows the result of calculating the third basic structure when the wavelength (blazed wavelength) wherein the diffraction efficiency is maximized is 415 nm. The total diffraction efficiency in the first optical path difference providing structure formed by superimposition of them corresponds to the value obtained by multiplying three diffraction efficiencies—the diffraction efficiency of the first basic structure shown in FIG. 5a, diffraction efficiency of the second basic structure shown in FIG. 5b, and diffraction efficiency of the third basic structure shown in FIG. 8a. The result of this calculation is given in FIG. 8b. Accordingly, the wavelength wherein the total diffraction efficiency of the first optical path difference providing structure formed by superimposition of the three basic structures is 405 nm, as shown in FIG. 8b. The fluctuation of the diffraction efficiency at the 405 nm wavelength of the blue-violet semiconductor laser beam is almost zero with respect to the wavelength fluctuation of 1 nm.

The diffraction efficiency will be described. In each basic structure, a plurality of beams of diffracted light having different orders of diffraction are produced. Calculation is made to find out the diffraction efficiency of the specific beams of diffracted light having a specific order of diffraction that forms a spot on the optical disk. Similarly, in the optical path difference providing structure formed by superimposition of a plurality of types of basic structures, a great number of beams of diffracted light are generated. Calculation is made to find out the diffraction efficiency of the specific diffracted light that forms a spot on the optical disk.

If a design is worked out in such a way that the wavelength wherein the diffraction efficiency of the third basic structure is maximized is longer than that wherein the diffraction efficiency of the first basic structure is maximized, there will be a shift toward an increase in the wavelength wherein the total diffraction efficiency in the first optical path difference providing structure formed by superimposition is maximized. This will suppress the wavelength fluctuation of the diffraction efficiency. Further, for the purpose of preventing much reduction of the peak value of the total diffraction efficiency, the deviation of the wavelength wherein the diffraction efficiencies of the first and third basic structures are maximized is preferably 4 nm or more without exceeding GO nm.

The same description applies to the basic structure of the peripheral region. One of the wavelengths of the first light flux wherein the diffraction efficiencies of the basic structures B and F are maximized is greater than the wavelength of 405 nm to be used, while the other is smaller. This arrangement provides the same advantages.

The invention claimed is:

1. An objective lens for use in an optical pickup apparatus which conducts reproducing and/or recording information by converging a light flux with a predetermined wavelength λ1 meeting 390 nm≦λ1≦420 nm on a information recording surface of an optical information recording medium, wherein at least part of a plurality of basic structures as optical path difference providing structures are mutually superimposed and formed on a predetermined region of an optical surface of the objective lens, and the objective lens satisfying the following expression:

$$(\lambda\beta-\lambda 1)-\times(\lambda\alpha-\lambda 1)<0 \qquad (1)$$

where λα is a wavelength within a range of the wavelength λ1±50 nm and at which a diffraction efficiency of one of the plurality of basic structures is maximized, and 243 is a wavelength within a range of the wavelength λ1±50 nm and at which a diffraction efficiency of another of the plurality of basic structures is maximized.

2. The objective lens for use in an optical pickup apparatus described in claim 1, wherein the objective lens satisfies the following expression:

$$4 \text{ nm} \leq |\lambda\alpha - \lambda\beta| \leq 60 \text{ nm} \quad (2).$$

3. The objective lens for the optical pickup apparatus described in claim 1, wherein the objective lens converges the light flux of the wavelength λ1 onto an information recording surface of an optical information recording medium having a protective substrate thickness of t1, whereby information is recorded and/or reproduced; and, at the same time, converges the light flux of the wavelength λ2 (λ2>λ1) onto an information recording surface of an optical information recording medium having a protective substrate thickness of t2 (t2≧t1), whereby information is recorded and/or reproduced.

4. The objective lens for the optical pickup apparatus described in claim 1, wherein the objective lens converges the light flux of the wavelength λ1 onto an information recording surface of an optical information recording medium having a protective substrate thickness of t1, whereby information is recorded and/or reproduced; converges the light flux of the wavelength λ2 (λ2>λ1) onto an information recording surface of an optical information recording medium having a protective substrate thickness of t2 (t2≧t1), whereby information is recorded and/or reproduced; and converges the light flux of the wavelength λ3 (λ3>λ2) onto an information recording surface of an optical information recording medium having a protective substrate thickness of t3 (t3>t2), whereby information is recorded and/or reproduced.

5. The objective lens for the optical pickup apparatus described in claim 4, wherein the plurality of basic structures include the first, second and third basic structures, wherein:
the first basic structure is an optical path difference providing structure for ensuring that an amount of diffracted light on the r-order (wherein "r" is an integer) of the light flux having the wavelength λ1 having passed through the first basic structure is greater than that of the diffracted light on any other order, an amount of diffracted light on the s-order (wherein "s" is an integer) of the light flux having the wavelength λ2 is greater than that of the diffracted light on any other order, and an amount of diffracted light on the t-order (wherein "t" is an integer) of the light flux having the wavelength λ3 is greater than that of the diffracted light on any other order; and
the second basic structure is an optical path difference providing structure for ensuring that an amount of diffracted light on the u-order (wherein "u" is an integer) of the light flux having the wavelength λ1 having passed through the second basic structure is greater than that of the diffracted light on any other order, an amount of diffracted light on the v order (wherein "v" is an integer) of the light flux having the wavelength λ2 is greater than that of the diffracted light on any other order, and an amount of diffracted light on the w-order (wherein "w" is an integer) of the light flux having the wavelength λ3 is greater than that of the diffracted light on any other order.

6. The objective lens for the optical pickup apparatus described in claim 5, wherein the plurality of basic structures include a third basic structure in addition to the first and second basic structures, and the third basic structure is an optical path difference providing structure for ensuring that an amount of diffracted light on the x-order (wherein "x" is an integer) of the light flux having the wavelength λ1 having passed through the third basic structure is greater than that of the diffracted light on any other order, an amount of diffracted light on the y-order (wherein "y" is an integer) of the light flux having the wavelength λ2 is greater than that of the diffracted light on any other order, and an amount of diffracted light on the z-order (wherein "z" is an integer) of the light flux having the wavelength λ3 is greater than that of the diffracted light on any other order.

7. The objective lens for the optical pickup apparatus described in claim 6, further wherein r=0, s=0, t=±1, u=2, v=1, w=1, x=10, y=6, z=5.

8. The objective lens for the optical pickup apparatus described in claim 4, wherein at least one of the plurality of basic structures is capable of correcting a spherical aberration caused by the thickness of the protective substrate of the optical information recording medium, in response to the difference between the wavelengths λ1 and λ2.

9. The objective lens for the optical pickup apparatus described in claim 4 at least one of the plurality of basic structures is capable of correcting a spherical aberration caused by the thickness of the protective substrate of the optical information recording medium, in response to the difference between the wavelengths λ1 and λ3.

10. The objective lens for the optical pickup apparatus described in claim 4, wherein at least one of the plurality of basic structures is capable of correcting a spherical aberration caused by the thickness of the protective substrate of the optical information recording medium, in response to the difference between the wavelengths λ1 and wavelengths other than λ1, and another of the plurality of basic structures is capable of correcting a spherical aberration caused by the temperature change when performing recording and/or reproducing operation into/from the optical information recording medium, using the light flux having the wavelength λ1.

11. The objective lens for the optical pickup apparatus described in claim 1, wherein at least one of the plurality of basic structures is capable of correcting a spherical aberration caused by a temperature change when performing recording and/or reproducing operation into/from the optical information recording medium, using the light flux having the wavelength λ1.

12. The objective lens for the optical pickup apparatus described in claim 1, wherein both the basic structure wherein the diffraction efficiency of wavelength λα is maximized, and the basic structure wherein the diffraction efficiency of wavelength λβ is maximized have a level difference that provides the optical path difference corresponding to four or more wavelengths of the wavelength λ1.

13. An optical pickup apparatus including a light source for emitting a light flux having a wavelength λ1, and the objective lens described in claim 1.

14. The optical pickup apparatus described in claim 13, further characterized by including a monitoring device for monitoring an intensity of the light flux before the light flux coming out of the light source enters the objective lens.

* * * * *